(12) United States Patent
Nakamura et al.

(10) Patent No.: US 12,078,837 B2
(45) Date of Patent: Sep. 3, 2024

(54) LIGHT DEFLECTION TAPE, RELATED METHOD AND USES

(71) Applicant: NITTO DENKO CORPORATION, Osaka (JP)

(72) Inventors: Kozo Nakamura, Osaka (JP); Minoru Miyatake, Osaka (JP); Yufeng Weng, Osaka (JP); Kari Rinko, Helsinki (FI); Shingo Matsumoto, Tokyo (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 18/019,284

(22) PCT Filed: Aug. 4, 2021

(86) PCT No.: PCT/JP2021/028953
§ 371 (c)(1),
(2) Date: Feb. 2, 2023

(87) PCT Pub. No.: WO2022/030542
PCT Pub. Date: Feb. 10, 2022

(65) Prior Publication Data
US 2023/0288624 A1 Sep. 14, 2023

(30) Foreign Application Priority Data
Aug. 6, 2020 (JP) .................................. 2020-134106

(51) Int. Cl.
*F21V 8/00* (2006.01)
(52) U.S. Cl.
CPC ......... *G02B 6/0023* (2013.01); *G02B 6/0065* (2013.01)
(58) Field of Classification Search
CPC ............................. G02B 6/0023; G02B 6/0065
See application file for complete search history.

(56) References Cited

U.S. PATENT DOCUMENTS 10,598,938 B1     3/2020   Huang et al.
2003/0213848 A1*  11/2003  Huston ............... G06K 7/12
                                                235/491
(Continued)

FOREIGN PATENT DOCUMENTS

CN    202813209    3/2013
JP    10-111511    4/1998
(Continued)

OTHER PUBLICATIONS

International Search Report issued in International Patent Application No. PCT/JP2021/028953, dated Oct. 12, 2021.
(Continued)

*Primary Examiner* — Evan P Dzierzynski
(74) *Attorney, Agent, or Firm* — GREENBLUM & BERNSTEIN, P.L.C.

(57) ABSTRACT

An optical deflection tape (10) attachable on a lightguide (20) is provided, comprising a substrate (10A) and at least one pattern (11) formed with a number of periodic pattern features (12) embedded in the substrate (10A) and configured as optically functional cavities (12) filled with a material having a refractive index different from the refractive index of the material of the substrate (10A) surrounding the cavity (12). The pattern (11) is configured to adjust direction of light received thereto such, that light incident at the pattern (11) is deflected to acquire a propagation path through a lightguide medium (20) via a series of total internal reflections and, by virtue of said at least one pattern (11), the optical deflection tape (10) is configured to control distribution of light propagating through the lightguide (20). A method for manufacturing the tape (10) and related uses are further provided.

36 Claims, 23 Drawing Sheets

(56) References Cited

U.S. PATENT DOCUMENTS

| | | |
|---|---|---|
| 2010/0061101 A1 | 3/2010 | Van Pieterson et al. |
| 2010/0080508 A1* | 4/2010 | Pijlman ................ G02B 6/0018 |
| | | 385/130 |
| 2011/0244187 A1 | 10/2011 | Rinko |
| 2014/0300710 A1* | 10/2014 | Shinoda ............... H04N 13/356 |
| | | 348/51 |
| 2015/0009687 A1 | 1/2015 | Lin |
| 2015/0192742 A1 | 7/2015 | Tarsa et al. |
| 2015/0253487 A1* | 9/2015 | Nichol ................. G02B 6/0028 |
| | | 362/610 |
| 2017/0176663 A1 | 6/2017 | Furuta et al. |
| 2018/0031840 A1 | 2/2018 | Hofmann et al. |
| 2018/0210129 A1* | 7/2018 | Uno .................... G02B 6/0043 |
| 2019/0064420 A1 | 2/2019 | Lee et al. |
| 2019/0162962 A1* | 5/2019 | Leighton .............. G02B 6/0065 |
| 2019/0196089 A1* | 6/2019 | Park ..................... G02B 6/0016 |
| 2020/0158939 A1* | 5/2020 | Lotan .................. G02B 6/0031 |
| 2021/0011211 A1 | 1/2021 | Rinko |

FOREIGN PATENT DOCUMENTS

| | | |
|---|---|---|
| JP | 2017-107174 | 6/2017 |
| WO | 2019069909 | 4/2019 |
| WO | 2019/182098 | 9/2019 |

OTHER PUBLICATIONS

Written Opinion issued in International Patent Application No. PCT/JP2021/028953, dated Oct. 12, 2021.

Moon et al., "Microstructured void gratings for outcoupling deep-trap guided modes", Opt. Express 26, 2018, pp. A450-A461.

Bernard C. Kress, "Optical waveguide combiners for AR headsets: features and limitations", Digital Optical Technologies 2019, Jul. 16, 2019, pp. 110620J.

Carlos Angulo Barrios et al., "Light coupling in a Scotch tape waveguide via an integrated metal diffraction grating", Opt. Lett. 41, 2016, pp. 301-304.

Extended European Search Report issued in EP Application No. 21853281.0, dated Jul. 18, 2024.

\* cited by examiner

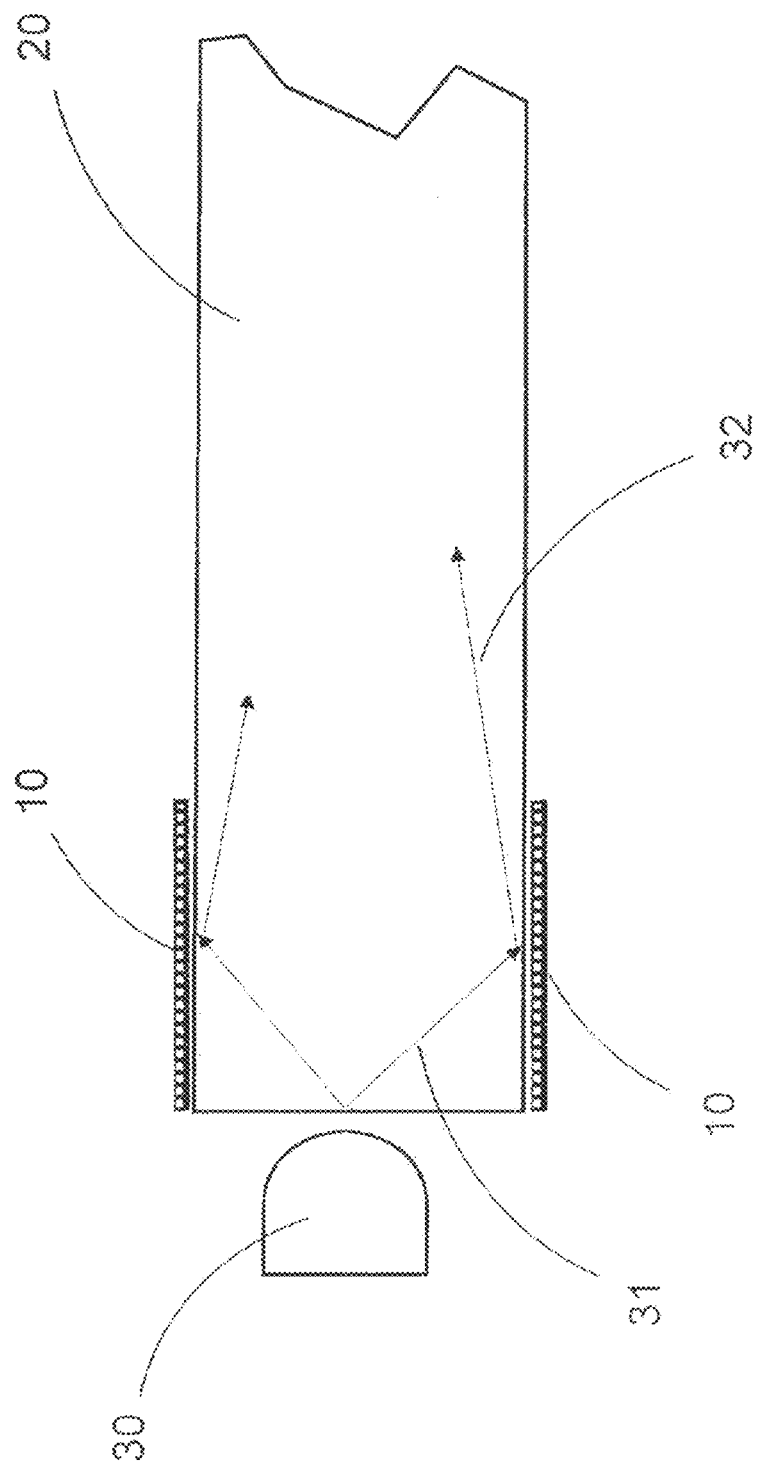
[Fig. 1A]

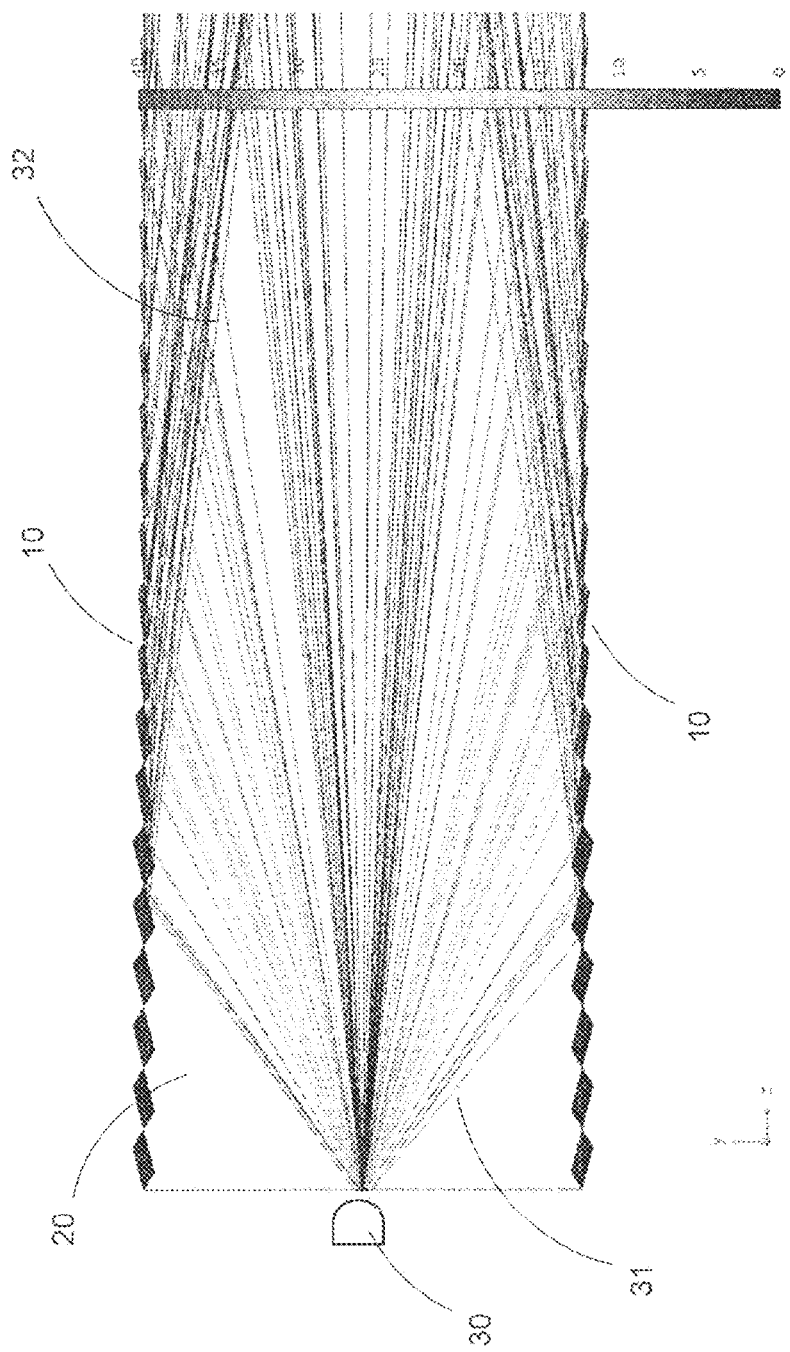
[Fig. 1B]

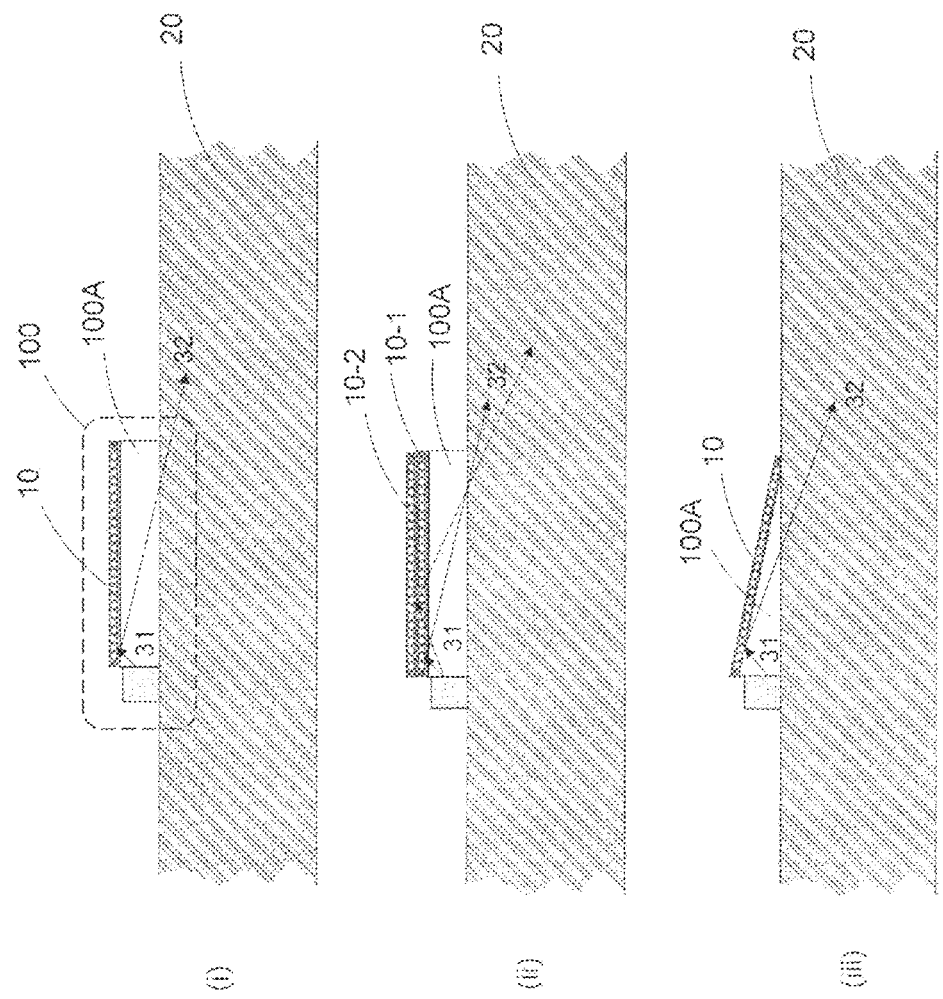
[Fig. 2]

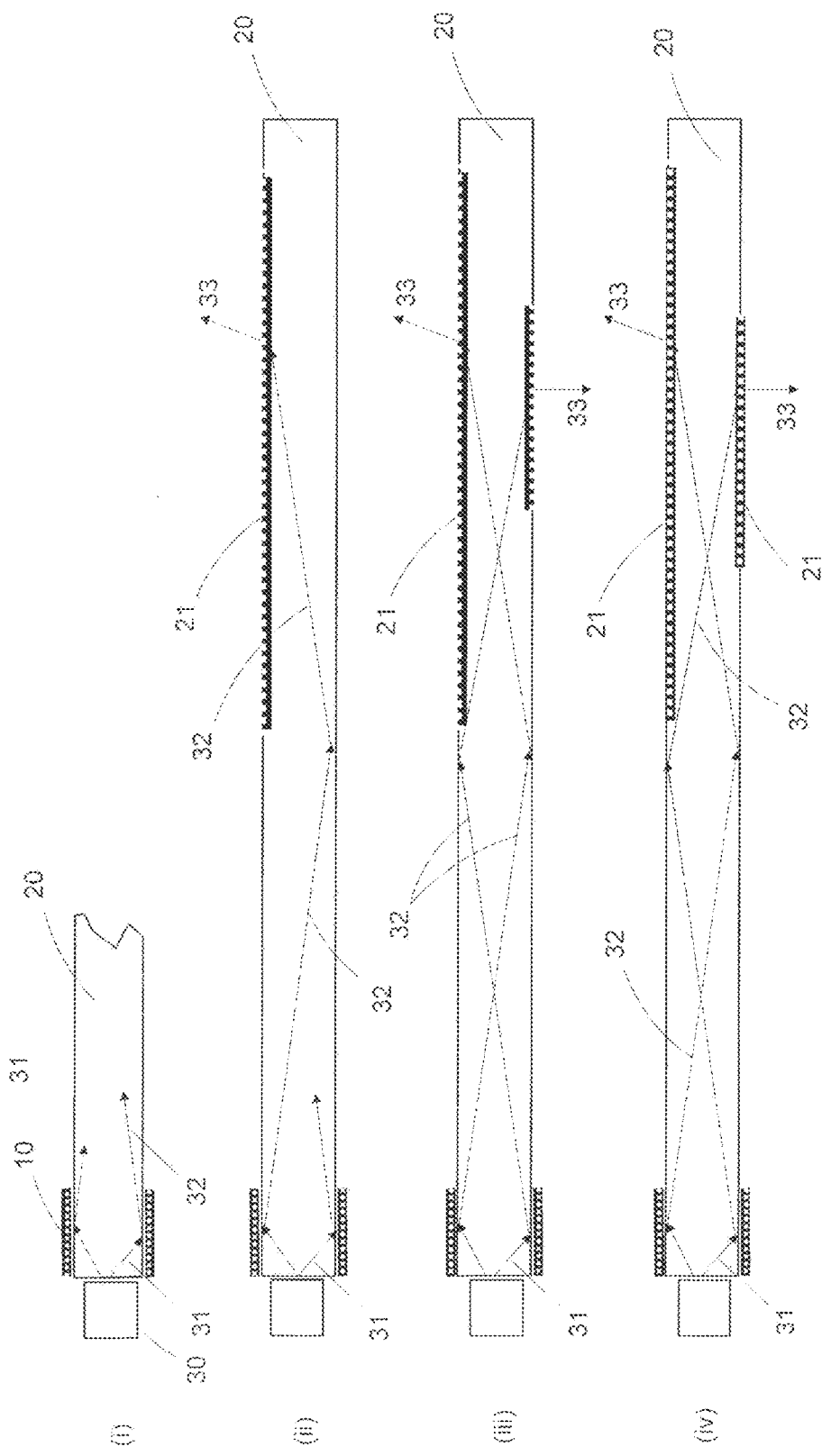
[Fig. 3]

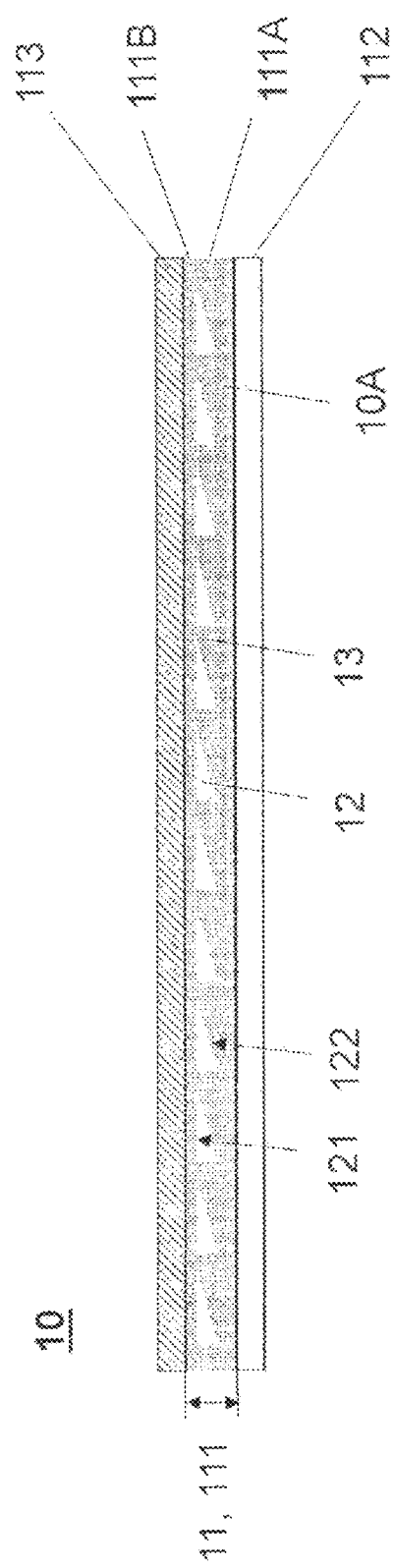
[Fig. 4A]

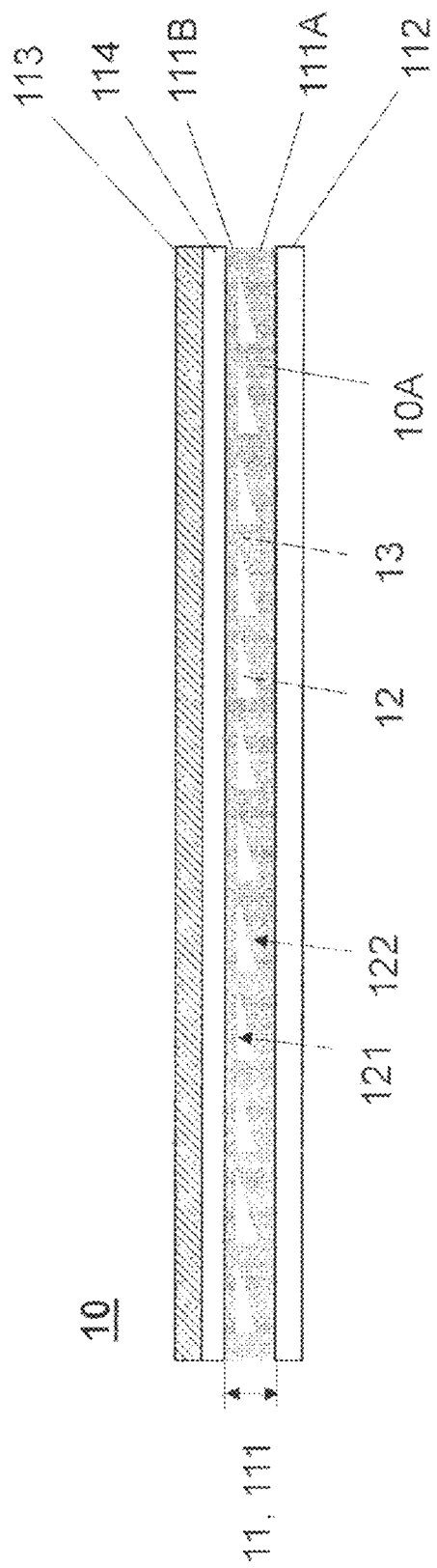
[Fig. 4B]

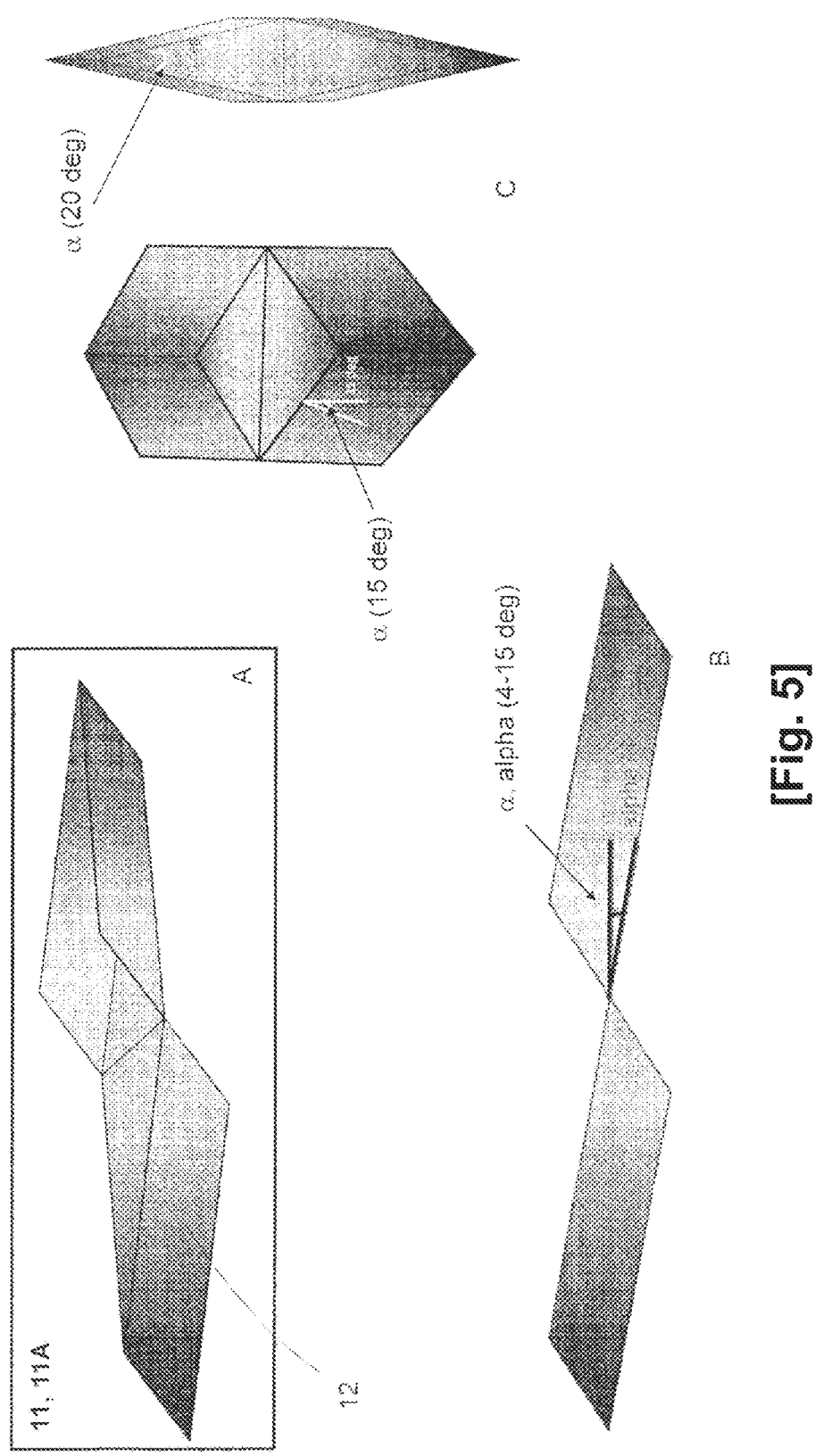
[Fig. 5]

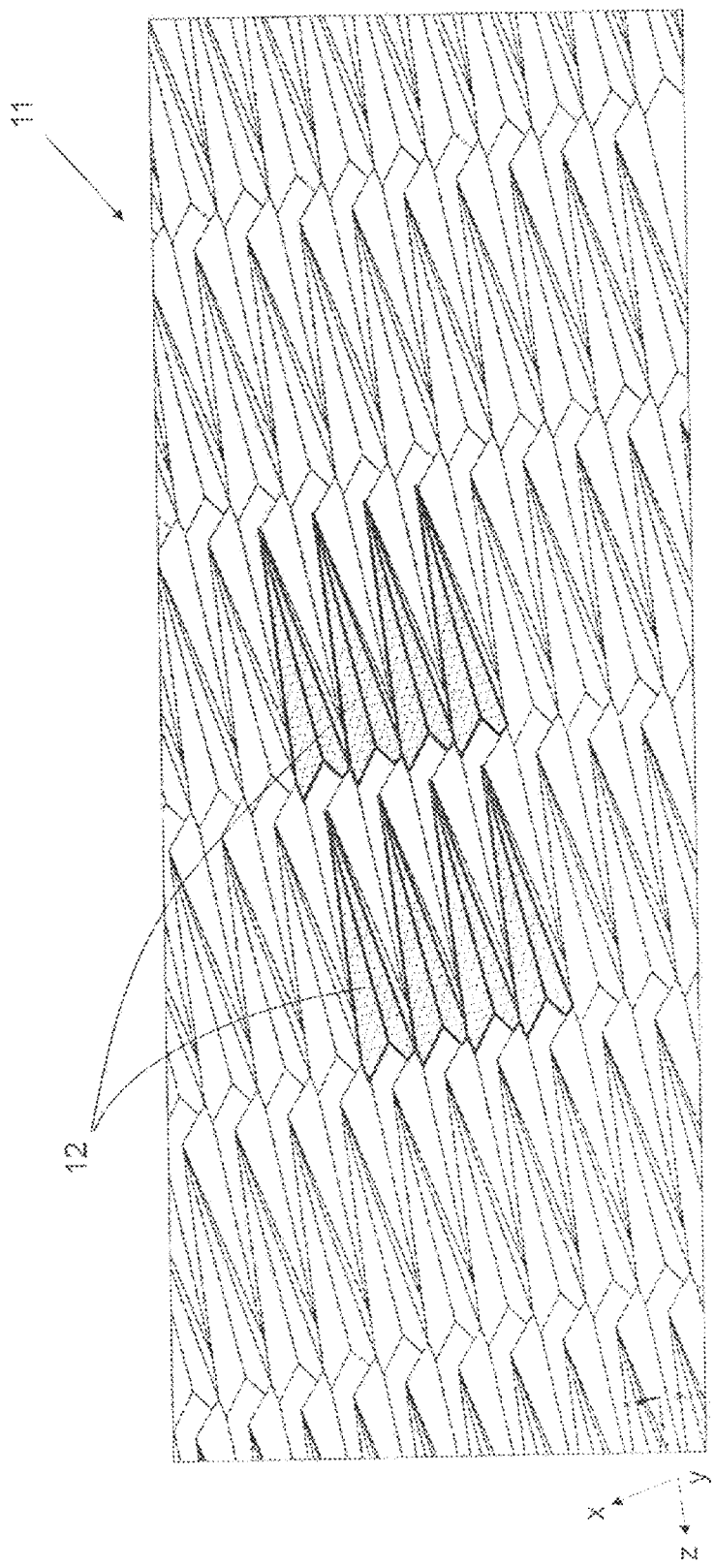
[Fig. 6]

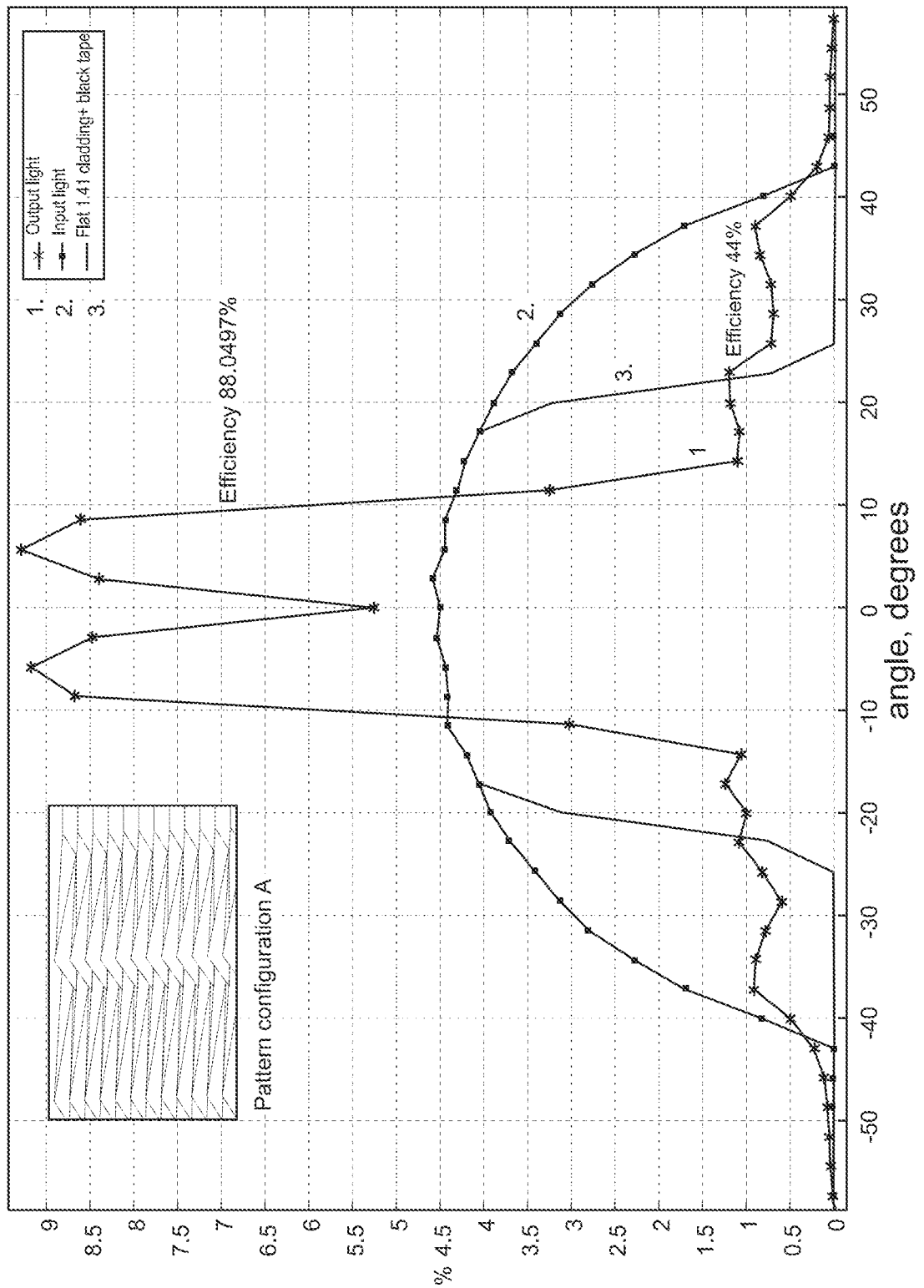

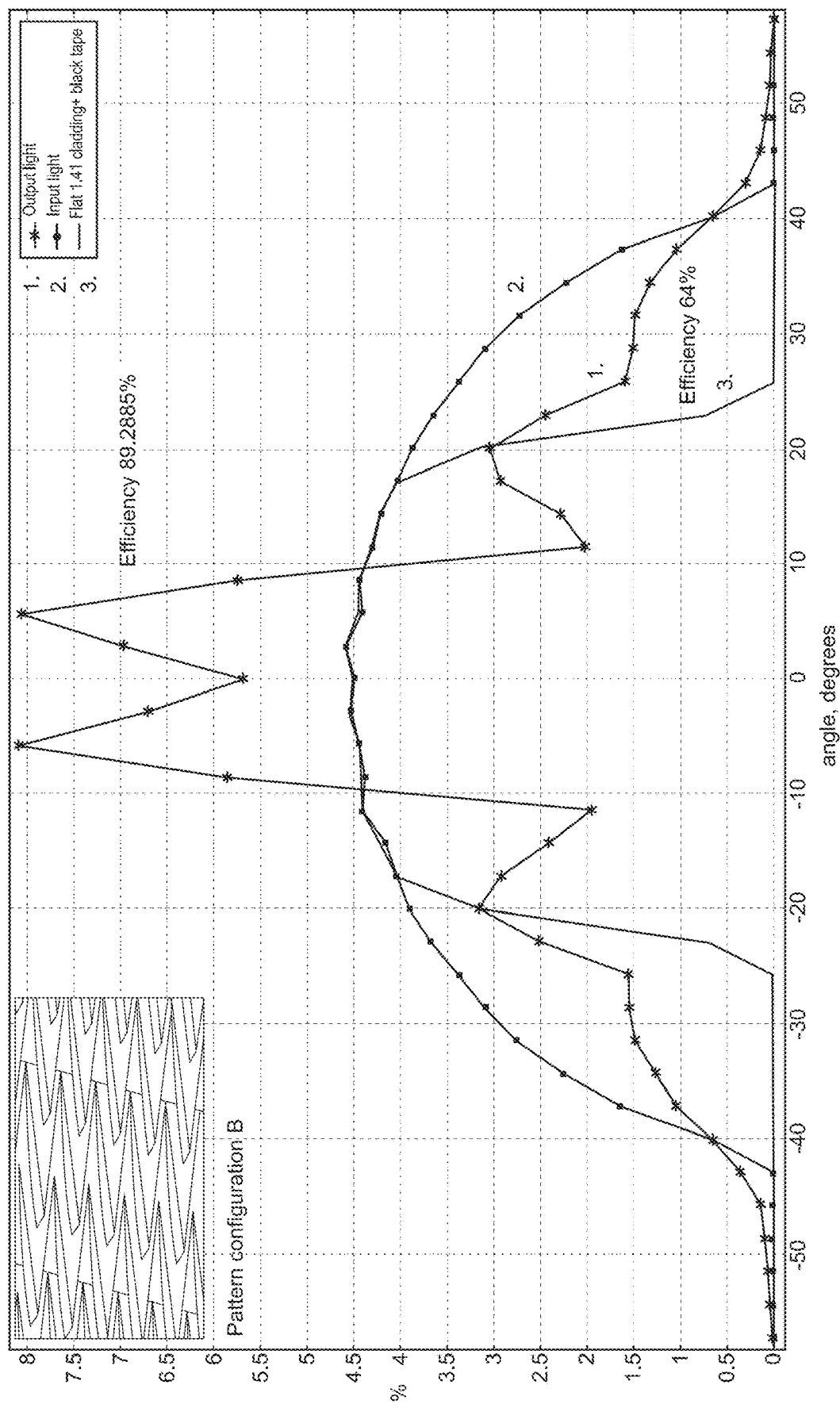
[Fig. 7B]

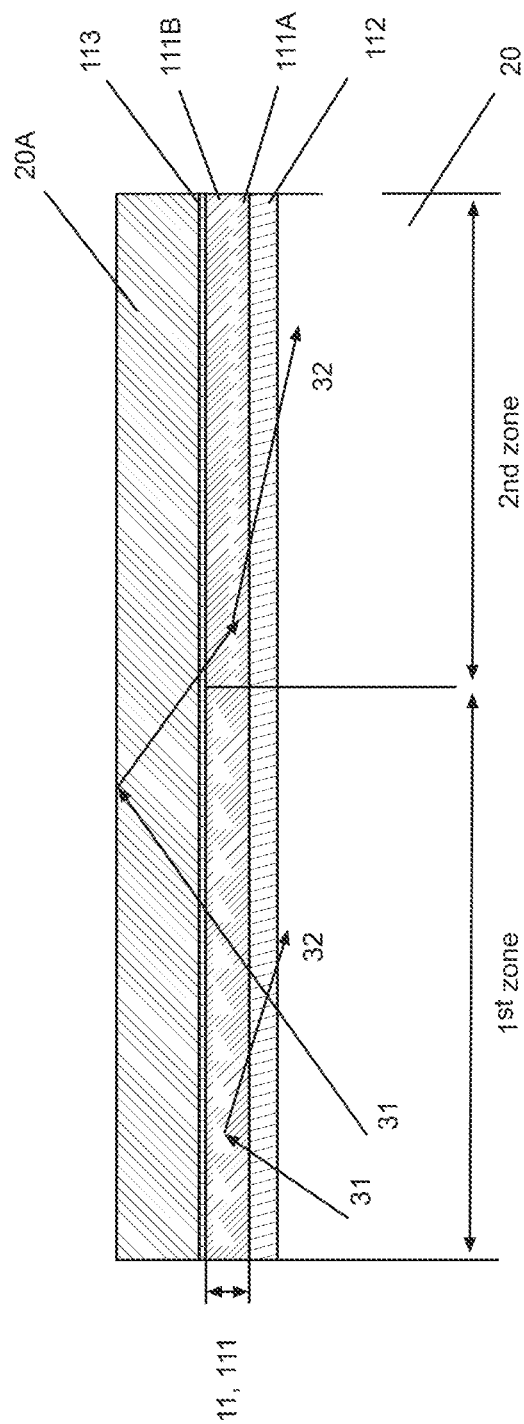
[Fig. 8]

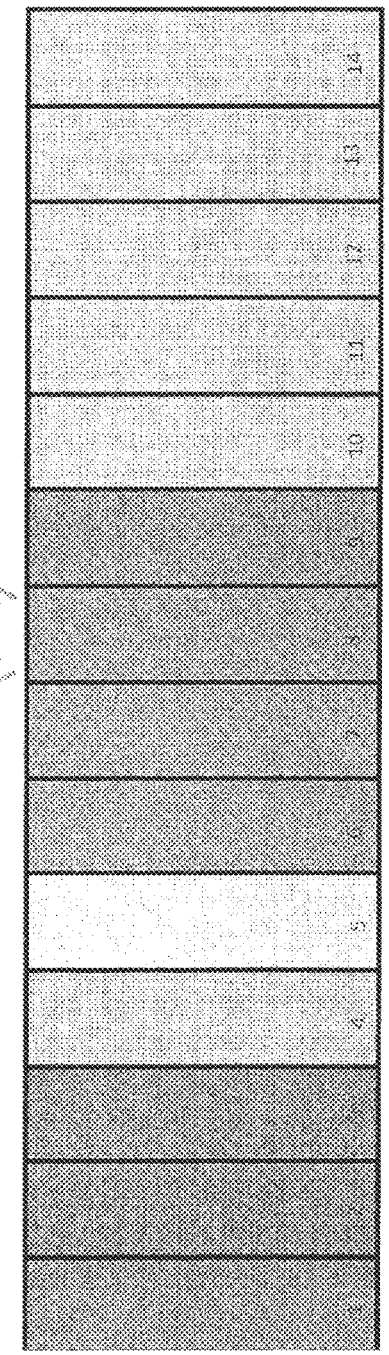
[Fig. 9]

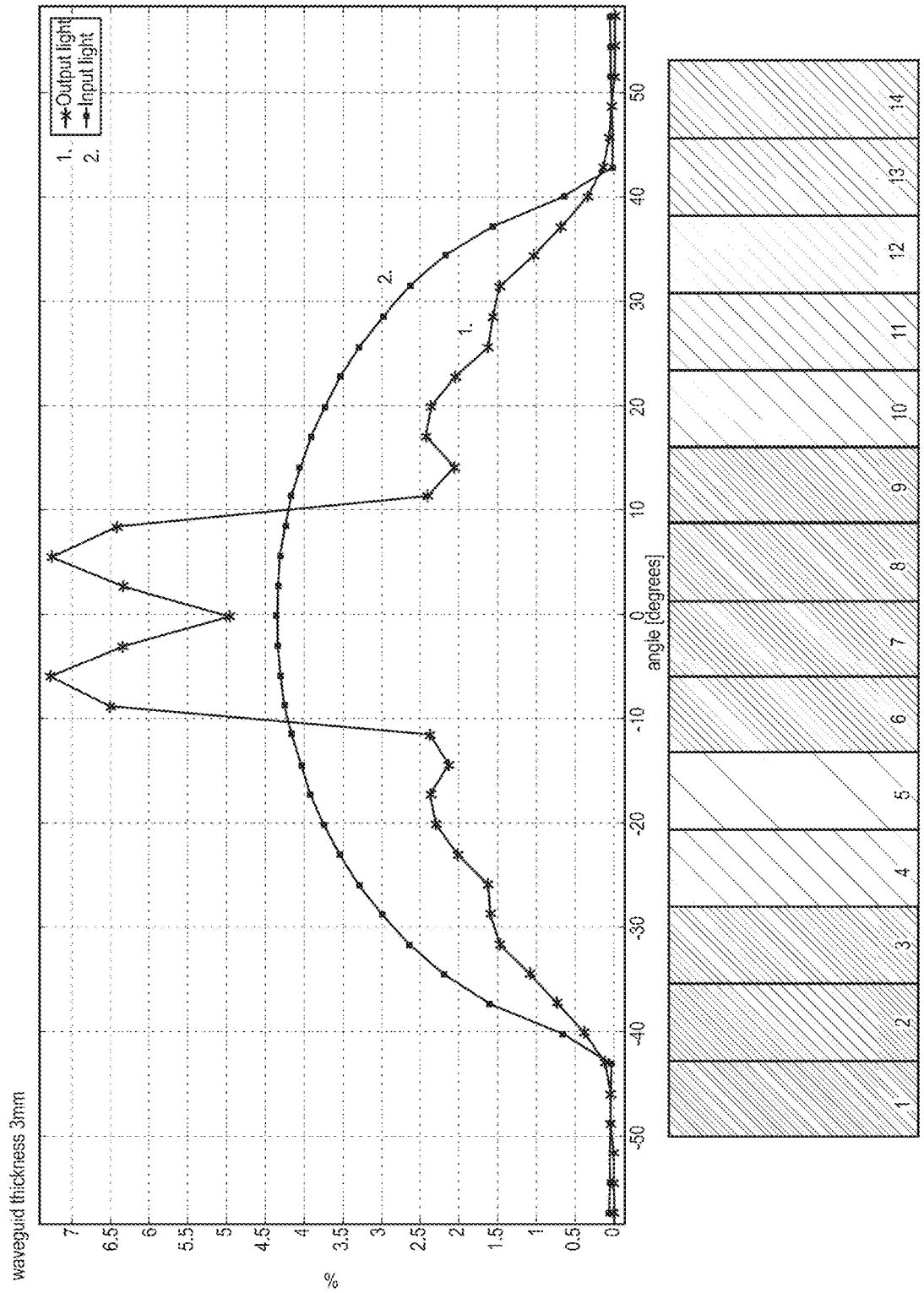
[Fig. 10A]

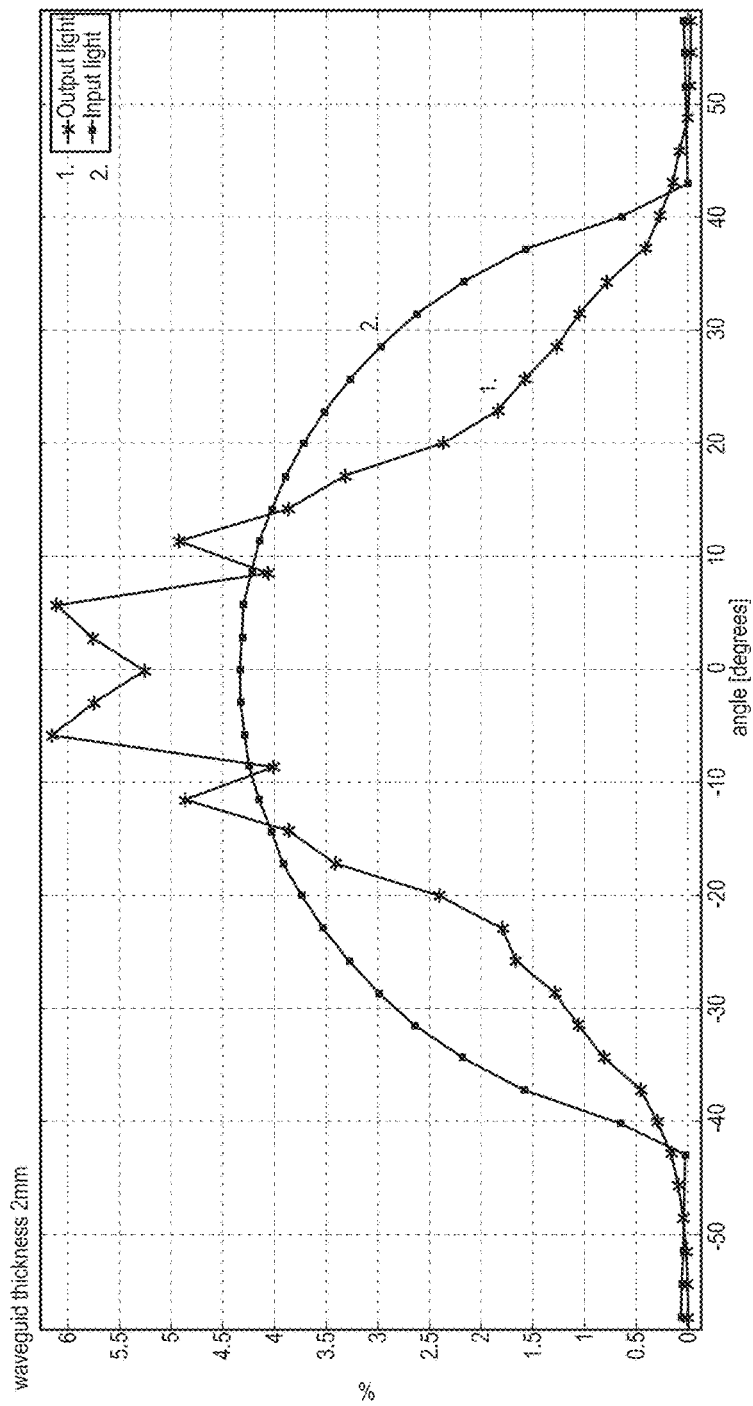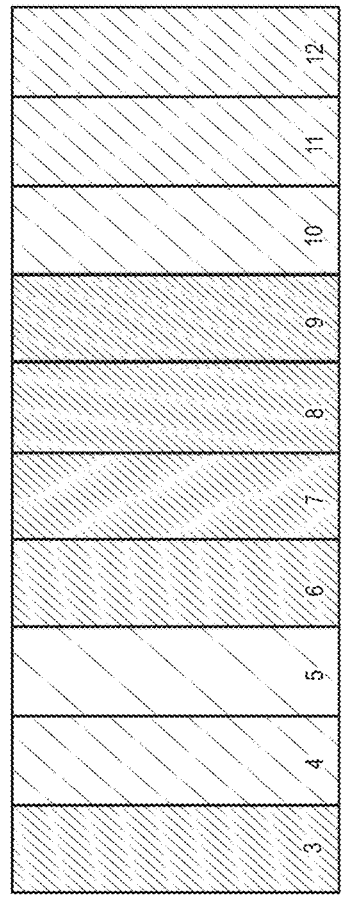
[Fig. 10B]

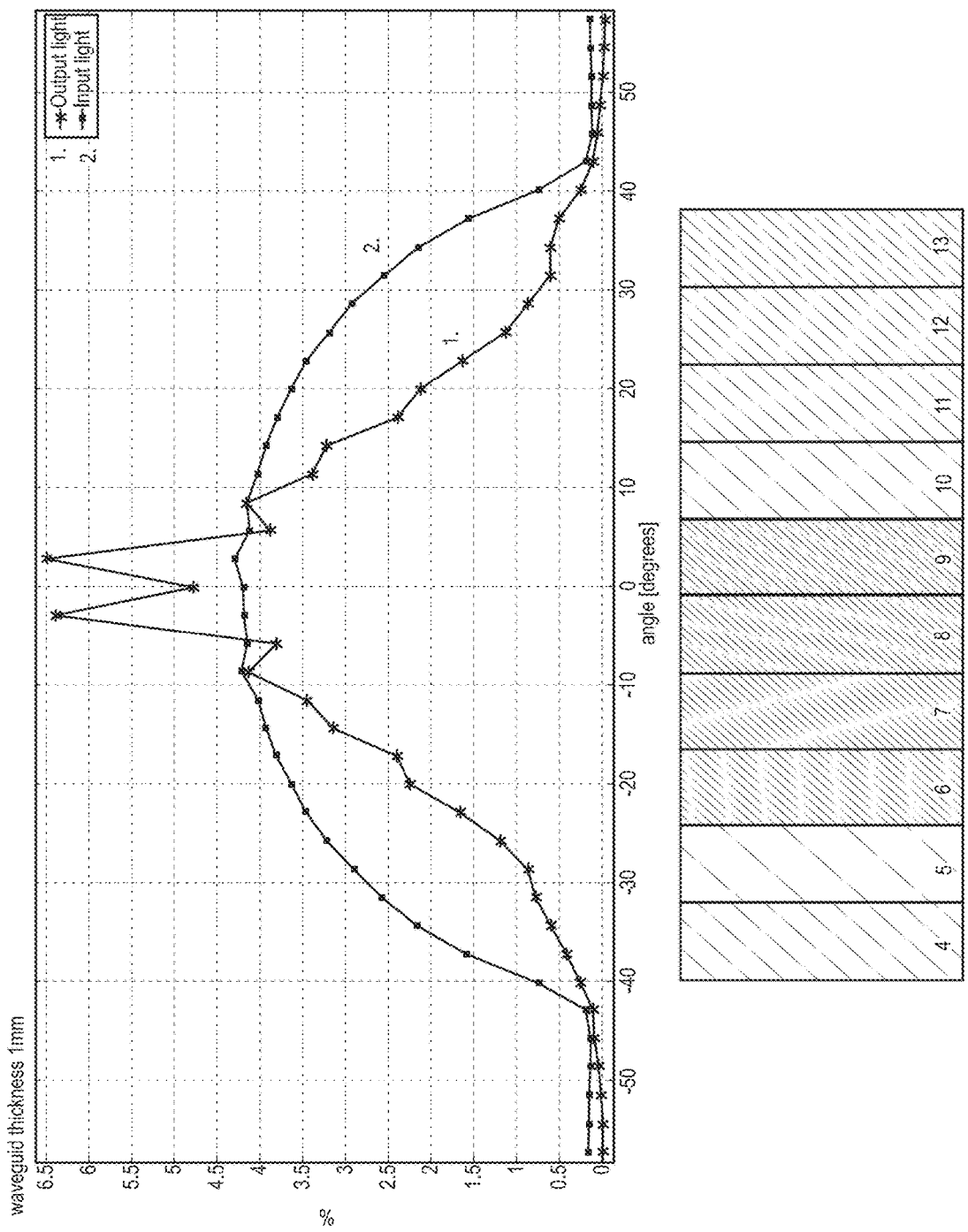
[Fig. 10C]

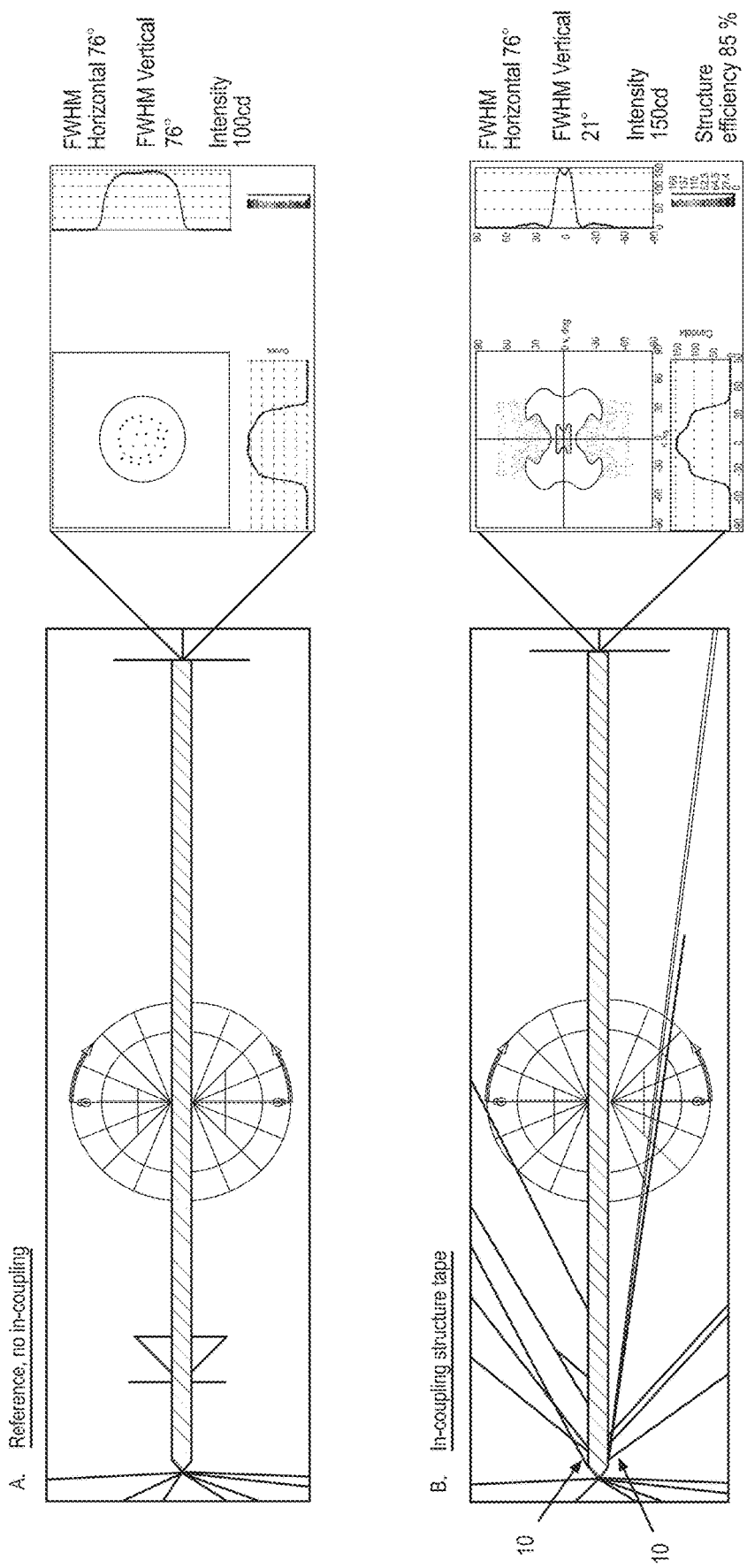
[Fig. 11]

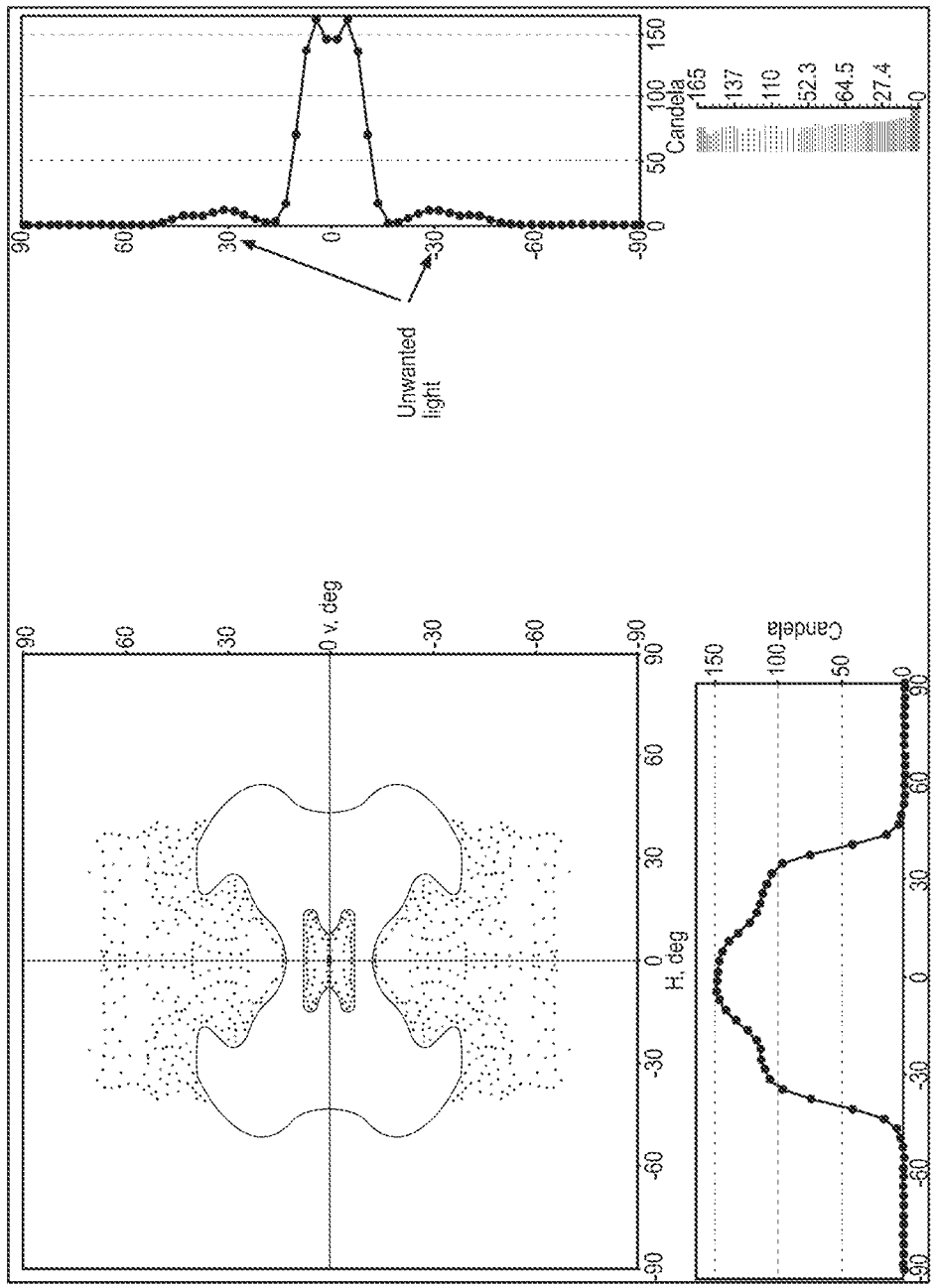
[Fig. 12A]

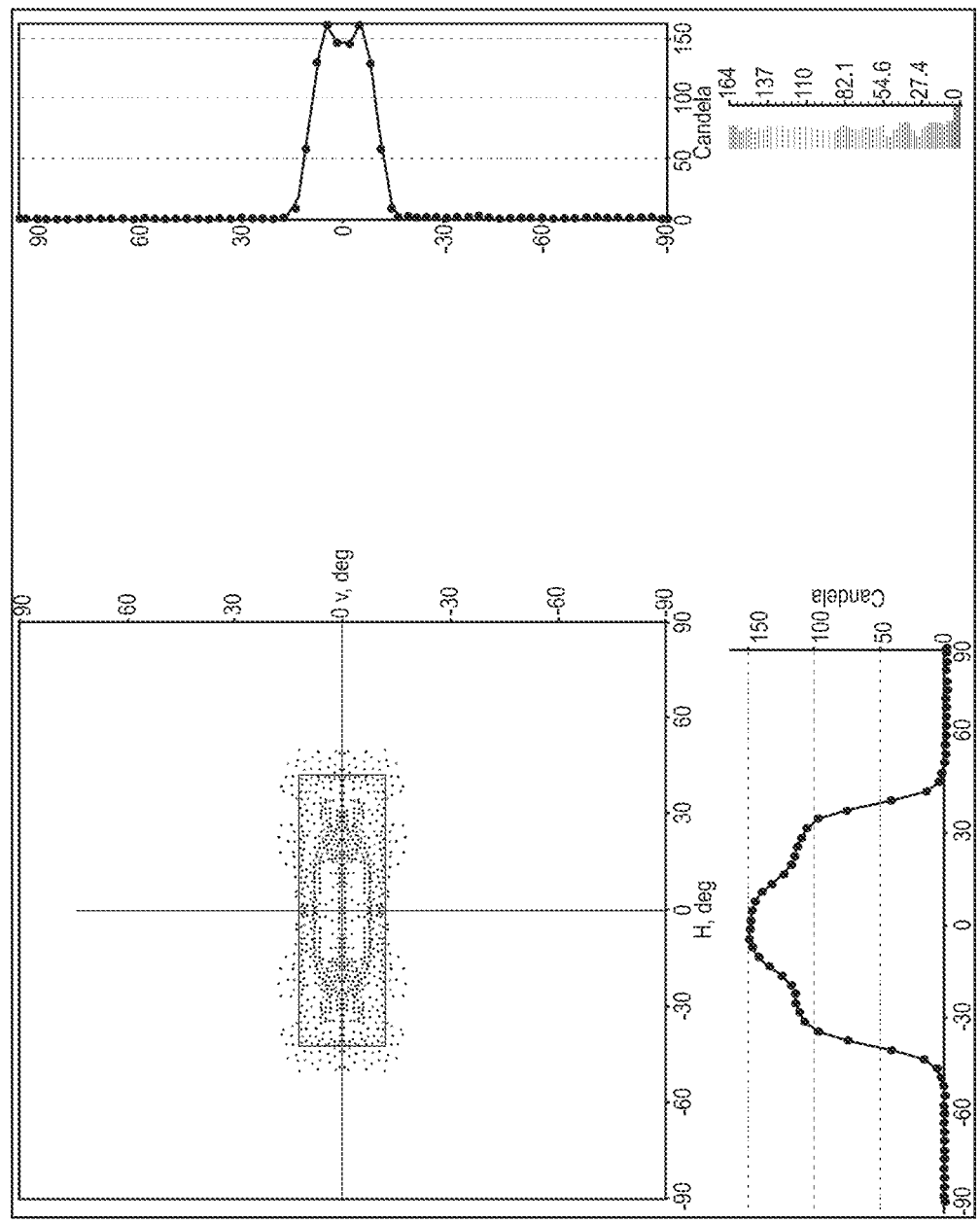
[Fig. 12B]

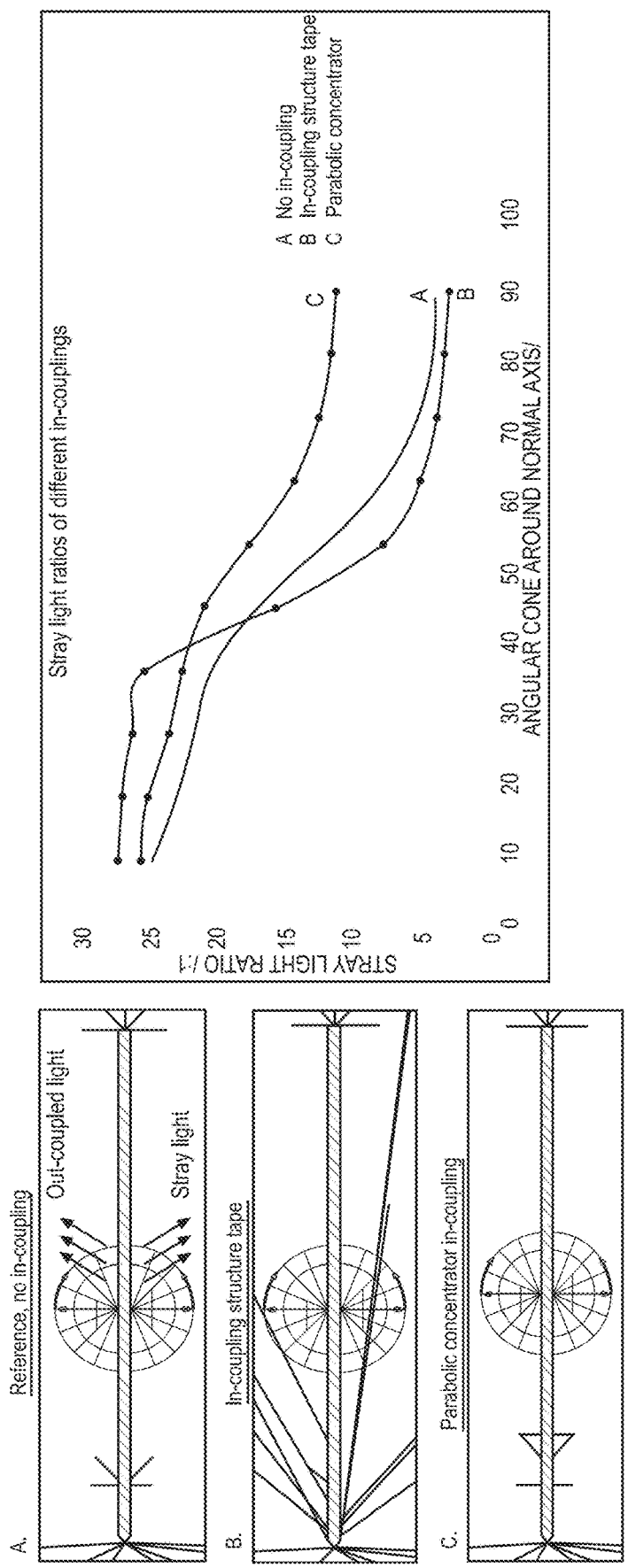
[Fig. 13]

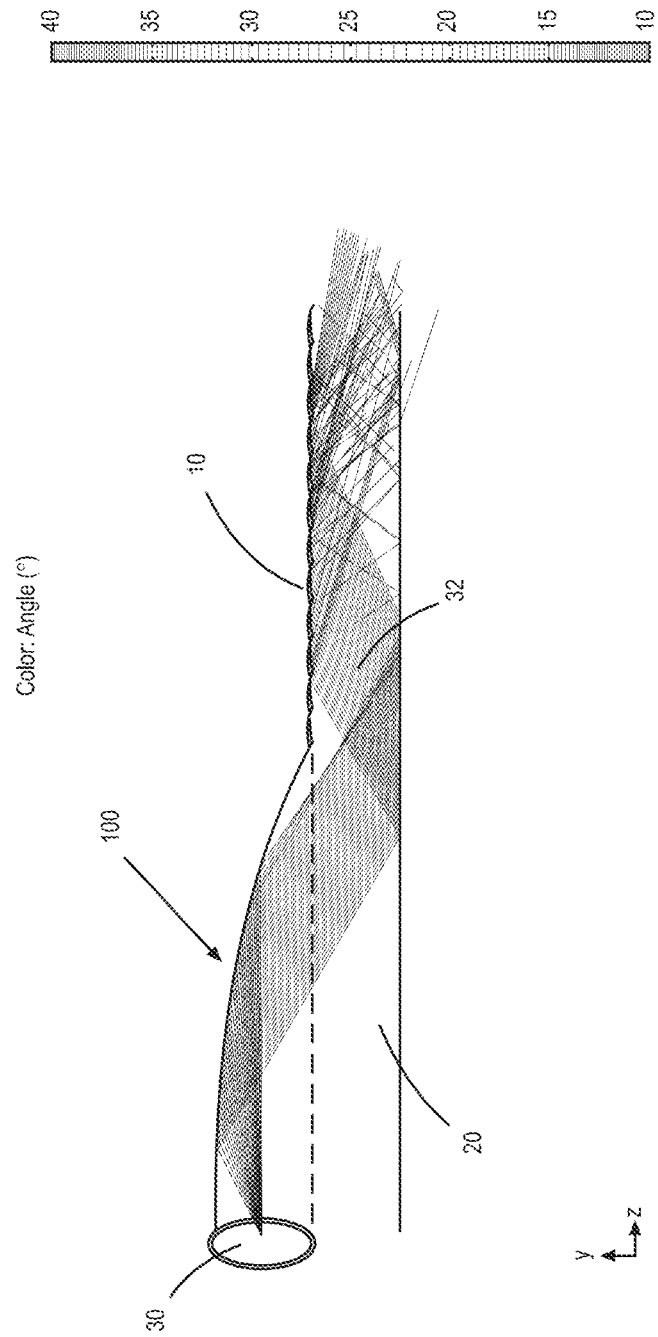
[Fig. 14A]

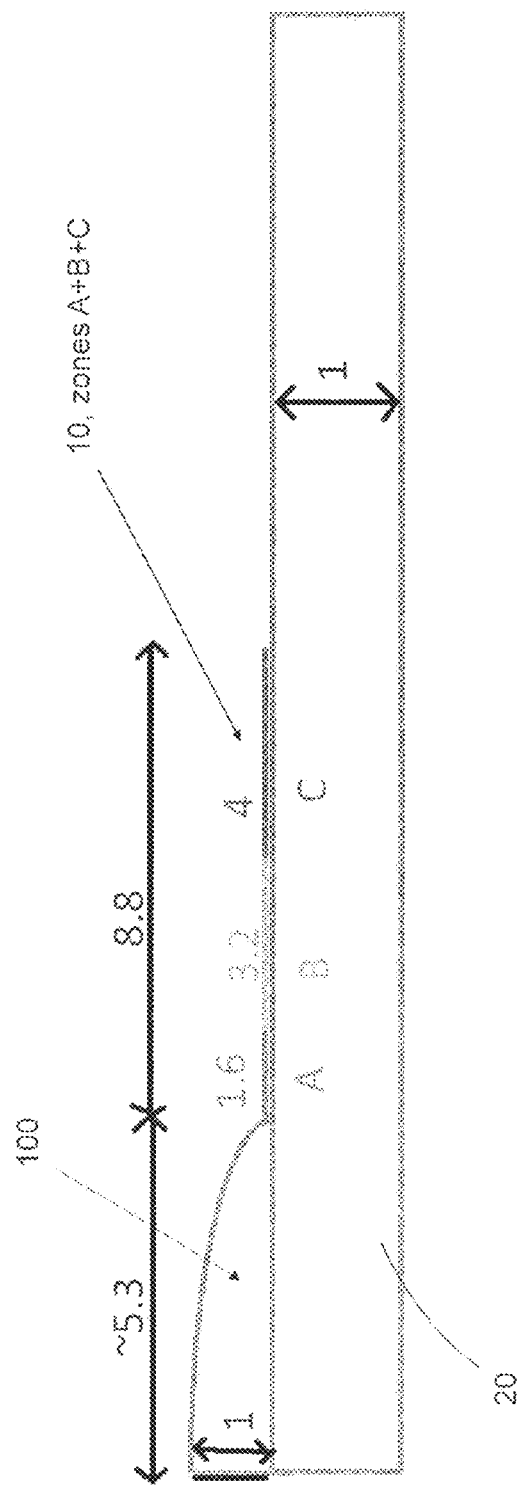
[Fig. 14B]

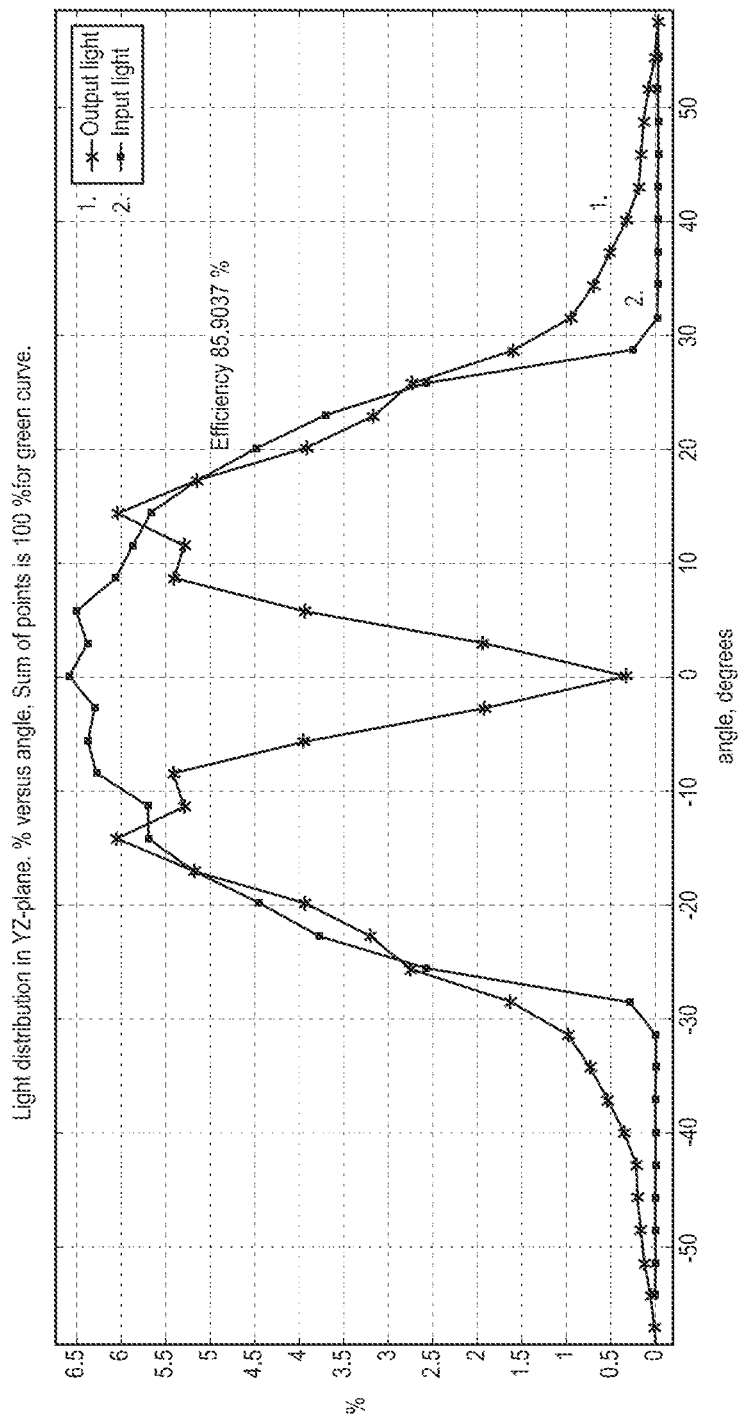
[Fig. 15A]

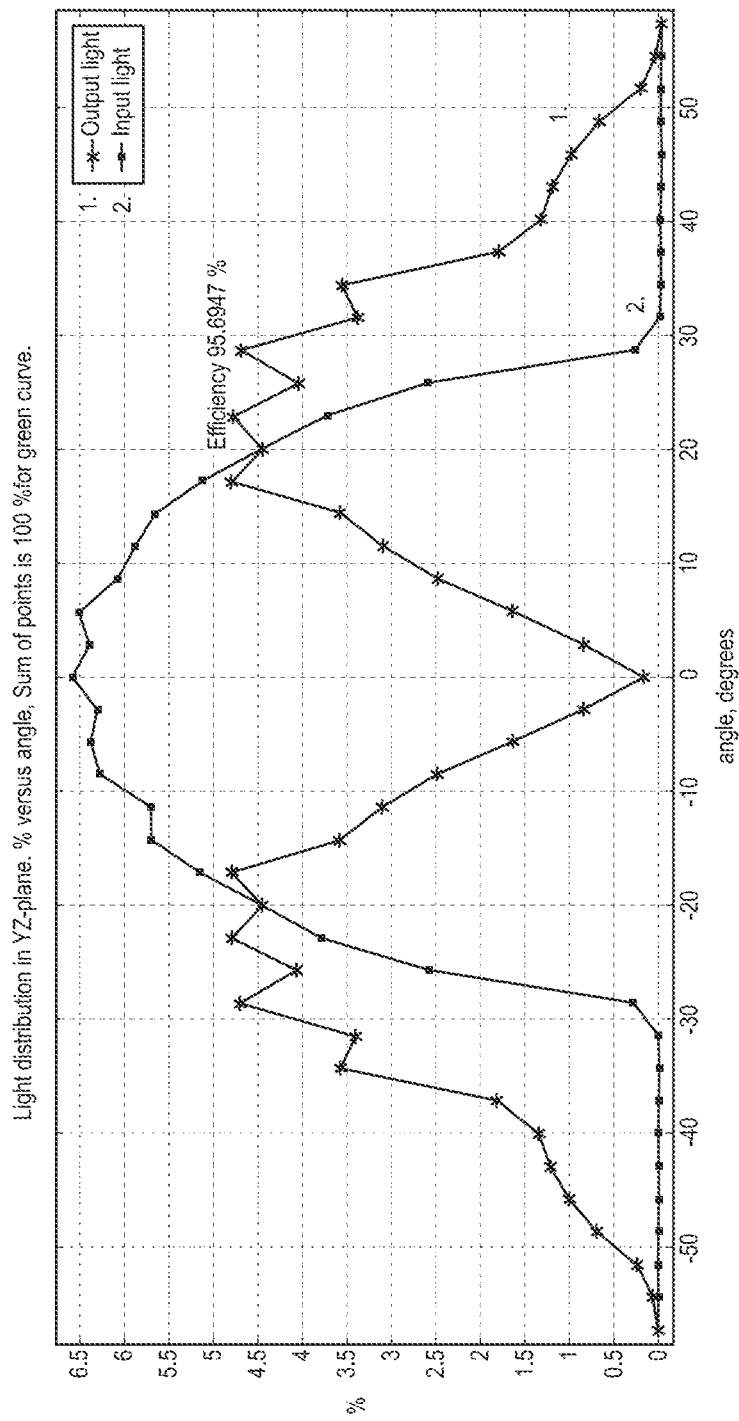
[Fig. 15B]

LIGHT DEFLECTION TAPE, RELATED METHOD AND USES

TECHNICAL FIELD

Generally the present invention pertains to provision of optical structures for waveguides and methods for producing the same. In particular, the invention concerns a flexible solution based on integrated cavity-optics adapted to control distribution of light propagation through an optical waveguide, related methods and uses.

BACKGROUND ART

Optical waveguide or lightguide technology has been widely used in a variety of state-of-the-art applications. Proper selection of a light distribution system often predetermines illumination performance of the optical waveguide in lighting- and display applications. A typical lightguide (LG) system contains components for edge incoupling light ray emitted by one or more emitter, components for light distribution through the lightguide element and component(s) or area(s) for light extraction (outcoupling). The incoupling structures receive light and adjust its direction to guide light rays into the light distribution area. Advanced lightguides include optical patterns that control edge incoupling light efficiency upon entering the lightguide.

In order to control angular distribution of emitted light and to achieve a desired optical performance, conventional lightguide solutions designed for illumination applications still utilize a number of separate optical films, such as brightness enhancement films (BEFs), for example. Known lightguide solutions implemented without BEFs typically employ microlens- and V-groove shaped optical patterns. By using such solutions, it is impossible to achieved fully controlled light distribution in a desired manner.

Angulo Barrios and Canalejas-Tejero [1] disclose a light coupling solution in a flexible Scotch tape waveguide attainable via an integrated metal diffraction grating. Incoupling and outcoupling gratings are embedded inside two layers of the Scotch tape; whereby the Scotch tape is rendered with an optical waveguide functionality. The grating is implemented as a metal (Al) nanohole array (NHA) grating.

US 2015/192742 A1 (Tarsa & Durkee) discloses a light extraction film laminated on the surface of a lightguide. Light extraction function is based on Total Internal Reflection (TIR). The extraction film forms air pockets between the film and the lightguide, upon being secured, by lamination, for example, to the lightguide.

US 2018/031840 A1 (Hofmann et al) discloses an optical element with an embedded optical grating to extract light from a lightguide. Surface of the grating is coated with an optically effective layer by using known methods, such as chemical vapour deposition (CVD) or physical vapour deposition (PVD). Moreover, the recesses present in the grating are filled up with an optical cement or optical adhesive material.

U.S. Pat. No. 10,598,938 B1 (Huang & Lee) discloses an angular selective slanted grating coupler for controlling angles at which the light is coupled out from the lightguide or coupled in the lightguide. Selectivity can be achieved by modulating refractive index between gratings or modulating a duty cycle of the gratings in different regions.

Kress [2] discloses in- and outcouplers for optical waveguides, said couplers comprising different types of gratings configured for a transmissive function and/or a reflective function. The couplers can sandwiched/buried in a lightguide or provided as surface relief solutions.

Moon et al [3] discloses an outcoupler using microstructured hollow (air) cavity gratings to improve light extraction in LED devices. Hollow cavities are fabricated in semiconductor materials with typical methods. Apart from LEDs, other applications (e.g. in lightguides) of the outcoupler solution are not provided.

WO2019/182098 (Rinko) discloses an optical device comprising a lightguide layer, at least one optical function layer provided on any surface of the lightguide layer, and a light beam control structure arranged on a surface of the first optical function layer opposite the lightguide layer at an end section on the light-incident side of the light guide layer. The light beam control structure reduces the light which is incident on the first optical function layer from the light guide layer edge at angles less than a critical angle. The first optical function layer may be a low refractive index layer. The light beam control structure may be a light redirecting tape, which can change the incident angle of the light output from the light source so as to satisfy the condition of total reflection beyond the critical angle. Mentioned publication does not define any details on provision of specific optical pattern(s) inside said tape, neither it provides any specific information on functionality, achievable performances and/or utilization applications associated with the optical pattern(s).

Designing and optimizing lightguide-based illumination-related solutions is confronted with a number of challenges associated with non-uniform light distribution inside the lightguide, insufficient coupling, light trapping and/or extraction efficiency. The above described solutions are also limited in a sense of being incapable of providing integrated air-cavity optics-based flexible solutions with satisfactory versatility and adaptability for a variety of target applications.

In this regard, an update in the field of optical structures for non-fiber lightguides aiming at enhancing luminance uniformity and improving optical efficiency of said lightguides, is still desired, in view of addressing challenges associated with manufacturing and assembling of presently existing solutions.

SUMMARY OF INVENTION

An objective of the present invention is to at least alleviate each of the problems arising from the limitations and disadvantages of the related art. The objective is achieved by various embodiments of an optical deflection tape, according what is defined in the independent claim 1.

In embodiment, an optical deflection tape for a lightguide is provided, the tape comprises a substrate and at least one pattern formed with a number of three-dimensional periodic pattern features embedded in a substrate material and configured as optically functional embedded cavities filled with a material having a refractive index different from the refractive index of the material of the substrate surrounding the cavity. In said tape, the pattern is configured to adjust direction of light received thereto such, that light incident at the pattern is deflected, by a cooperative optical multi-function, provided as a combination of at least two functions selected from a group consisting of: a reflection function, a refraction function, a diffraction function, a transmission function and an absorption function, to acquire a propagation path through a lightguide medium via a series of total internal reflections, wherein by virtue of said at least one pattern, the optical deflection tape is configured to control distribution of light propagating through the lightguide.

In embodiment, the optical deflection tape is configured attachable onto at least one planar surface of the lightguide.

In embodiment, the tape is configured such, that light received at the pattern is deflected at an interface between each said cavity and the material of the substrate surrounding the cavity to acquire the propagation path through the lightguide medium, whereupon an angle of incidence at an interface between the lightguide medium and an ambient, and, optionally, an angle of incidence at the interface between each cavity and the material of the substrate surrounding the cavity is/are larger than or equal to a critical angle of total internal reflection.

In embodiment, at least one cavity pattern provided in the tape is configured to perform an optical function related to adjusting direction of light received thereto, wherein said optical multi-function is selected from a group consisting of: a deflection function, a reflection function, an absorption function, a transmittal function, a collimation function, a refraction function, a diffraction function, a diffusion function, a polarization function, and any combination thereof.

In embodiment, the pattern is rendered optically multi-functional by providing a cavity or a group of cavities in the pattern with a number of parameters, wherein the number of parameters comprises any combination of parameters selected from the group consisting of: dimensions, shape, cross-sectional profile, orientation, position, periodicity, and fill factor.

In embodiment, each individual three-dimensional cavity in the pattern has a number of optically functional surfaces. Said optically functional surface or surfaces is/are established by any surface or surfaces formed at the interface between each cavity and the material of the substrate surrounding the cavity. In various configurations, the optically multi-functional surface or surfaces in each individual cavity in the pattern is/are established with any one of a low refractive index reflector, a polarizer, a diffuser, an absorber, or any combination thereof.

In different embodiments, the cavities are configured and arranged in the pattern such, as to form a substantially variable three-dimensional periodic pattern or to form a substantially constant three-dimensional periodic pattern. In embodiment, the pattern with the cavities are established with discrete or at least partly continuous pattern features.

In embodiment, the optical deflection tape comprises a number of patterns arranged in periodic segments, each segment having a predefined area and a length of a period.

In some embodiments, the tape comprises patterns arranged to form at least two adjacent functional zones, wherein the pattern forming a first functional zone and the pattern forming a second functional zone are independently configured to perform the optical function related to controlling the distribution of light propagating through the lightguide, and, wherein the pattern forming the first functional zone is additionally configured to transmit at least a portion of light incident at said pattern to an optical collector medium. The tape can be further configured such, that the first- and the second functional zones alternate n times along the surface of the lightguide and the entire surface of the optical collector medium.

In embodiments, the patterns are configured variable by a number of cavity-related parameters, wherein the number of cavity-related parameters comprises an individual parameter or any combination of parameters selected from the group consisting of: dimensions, shape, cross-sectional profile, orientation, position, periodicity, and fill factor.

In embodiments, the cavities are established with three-dimensional pattern features having cross-sectional profiles selected from the group consisting of: linear, rectangular, triangular, blazed, slanted, trapezoid, curved, wave-shaped and sinusoidal profiles.

In embodiment, the cavities are filled with a gaseous material, such as air.

In embodiment, the optical deflection tape is configured attachable onto a planar surface or planar surfaces of the lightguide by adhesion.

In embodiments, the pattern or patterns comprise(s) cavities formed in the substrate provided as an essentially flat, planar substrate layer. Said essentially flat, planar substrate layer, in which the cavities are formed, can be made of substantially optically transparent material. In embodiments, the pattern or patterns comprise(s) cavities formed at an interface with an additional flat, planar substrate layer, provided as an optically transparent layer, a reflector layer, and/or a coloured layer.

In embodiment, the optical deflection tape comprises a number of embedded patterns arranged in a stacked configuration.

In embodiment, the optical deflection tape further comprises a wavelength conversion layer.

In another aspect, an optical incoupling element is provided according to what is defined in the independent claim 23. Said element advantageously comprises an element substrate and an optical deflection tape according to some previous aspect, said tape being attached onto a surface of said element substrate. Surface of the element substrate can be planar or curved.

In another aspect, a method for manufacturing an optical deflection tape is provided, in accordance to what is defined in the independent claim 25.

In embodiment, the method comprises
  manufacturing a patterned master tool for said at least one pattern by a fabrication method selected from any one of: lithographic, three-dimensional printing, micromachining, laser engraving, or any combination thereof;
  transferring the pattern onto the substrate to generate a patterned substrate; and
  generating an embedded three-dimensional cavity pattern or patterns by applying onto said patterned substrate an additional flat, planar substrate layer, such that internal cavities are formed at a fully flat, planar interface between the substrate layers,
  wherein the embedded cavities are configured as optically multi-functional cavities filled with a material having a refractive index different from the refractive index of the material of the substrate surrounding the cavity, and wherein the pattern is configured to adjust direction of light received thereto such, that light incident at the pattern is deflected, by a cooperative optical multi-function, provided as a combination of at least two functions selected from a group consisting of: a reflection function, a refraction function, a diffraction function, a transmission function and an absorption function to acquire a propagation path through a lightguide medium via a series of total internal reflections, and wherein by virtue of said at least one pattern, the optical deflection tape is configured to control distribution of light propagating through the lightguide.

In further aspect, a lightguide is provided according to what is defined in the independent claim 28. Said lightguide comprises an optically transparent medium configured to establish a path for light propagation through the lightguide, and an optical deflection tape, according to some previous aspect, said tape being attached onto at least one planar surface of said lightguide.

In embodiments, the optical deflection tape is attached to the lightguide medium attached thereto by adhesion.

In embodiment, the lightguide further comprises at least one emitter device selected from a group consisting of: a Light Emitting Diode (LED), an Organic Light Emitting Diode (OLED), a laser diode, a LED bar, an OLED strip, a microchip LED strip, and a cold cathode tube.

In embodiment, the lightguide comprises at least one light emitter device configured for emitting monochromic light, and the optical deflection tape that comprises the wavelength conversion layer.

In further aspect, use of a lightguide according to the previous aspect is provided in illumination and/or indication, in accordance to what is defined in the independent claim 32.

In further aspect, a roll of an optical deflection tape is provided, in accordance to what is defined in the independent claim 33, wherein the optical deflection tape is implemented according to some previous aspect.

In further aspect, an optical unit is provided according to what is defined in the independent claim 34. Said unit comprises at least one optical incoupling element according to some previous aspect, with an adhesion layer for a lightguide attachment and at least one emitter device.

In embodiment, at least one emitter device is at least partly integrated inside the element substrate, or installed adjacent to or on the element substrate.

The utility of the present invention arises from a variety of reasons depending on each particular embodiment thereof. At first, the invention pertains to a novel optical tape solution configured to deflect light and to harmonize an internal plane wave propagation and distribution in an optical element, such as an optical waveguide (a lightguide). The optical tape according to the present invention is advantageously designed for a planar, non-fiber lightguide.

The tape, which is configured attachable to at least on one surface of said optical element by an adhesive layer, for example, controls directions of incident light inside the optical medium (viz., the lightguide medium). The incident light is deflected from the original propagation path by a certain angle by means of (air)-cavity optics embedded inside of the tape. Totally integrated and embedded cavity optics is based on three-dimensional pattern matrix, which may comprise a single-profile or multiple profiles, and by virtue of profile configuration, to attain a desired light management.

Optical deflection tape, according to the present disclosure, is easy and reliable to utilize because of its embedded cavity optics, which, due to its internal nature, cannot be destroyed or defected by normal handling procedures, including assembling, cleaning, etc. In a ready-to-use state the tape does not have any surface relief patterns formed on its surfaces. Since the tape has entirely flat and planar external surfaces, it possible to touch and clean the tape without modifying or losing its optical performance. The tape can be easily attached, by means of an adhesive surface, for example, onto the related optical element, either manually or in an automated manner.

The optical deflection tape allows for at least collimating, redirecting and/or harmonizing light incoupled into the optical element (lightguide). The tape provides for the following positive impact: a) achieving light out-coupling efficiency without optical enhancement and diffuser films; and b) achieving transparent illumination with minimized stray light.

Flexible tape solution can be configured with any desired combination of size-related parameters (length×width× thickness/height). The tape is easy to apply on any surface of the lightguide, e.g. any side- and/or edge(s). The tape comprises advanced (air)-cavity optics that enables a major part of light to be collimated (with about 10 degree variation in vertical distribution). The solution thus allows for minimizing stray light, thus enhancing total efficiency of the lightguide.

In some preferred embodiments, the solution provided hereby is advantageously realized as integrated (internal) cavity optics. In conventional solutions that involve optical cavities light is often transmitted (penetrated) into said cavities, whereby undesired refraction is caused and light distribution control is not achievable. On the contrary, in the solution presented hereby extracted light distribution (in terms of refraction angle and directions, accordingly) can be controlled with high precision by TIR functionality of the associated optically functional feature pattern.

Optical design of the light deflecting tape can be constant, with the optical pattern solutions being based on similar and continuous repeating patterns, such as comprising periodical features. Alternatively, the tape may comprise continuously variable patterns or segmental patterns, wherein each local pattern design is predetermined for a characteristic angle of incidence or a range of incidence angles. Naturally, the solution is designed and optimized for certain lightguide thicknesses and other specific parameters.

In case of multifunctional use for different elements and setups, the optical pattern design can be divided to deterministic periodical segments/zones having different pattern profiles in each, wherein the length of period or area of each particular segment/zone is predetermined. Each segment/zone can be marked with characteristic sign or signal in order to manage and identify each local segments/zones. The segments can be cut from the different parts of the tape according to these markings. This enables efficient utilization of the same optical deflecting tape for different lightguide elements, such as for the lightguides having different thicknesses.

One of the principal purposes the light deflecting tape according to the present invention aims at is improving functionality of the optical element, such as lightguide, wherein the tape is adhered onto its surface. The deflection tape can be used alone or in combination with an optical incoupling tape and/or an element. The deflecting tape can thus be applied close to a light incoupling edge and/or any one of the light incoupling tape or the incoupling element mounted onto the lightguide planar surface. Additionally or alternatively, the deflection tape can be applied much further from the light incoupling area, basically in any region(s) within a light distribution area (also in multiple regions), in order to provide an optimal optical performance.

One of the major benefits provided by the deflection tape applied on the lightguide is enhancing and harmonizing a proportion between incoupled and outcoupled light. In this functional combination the incoupled light, typically entering the lightguide from the edge of the lightguide medium, is controlled and modified by the deflecting tape in order to achieve more narrow internal light distribution inside the lightguide medium, meaning at least partial collimation of light along the vertical axis, wherein the angle of incidence of deflected (direction-adjusted) light exceeds a critical angle of total internal reflection.

Internal light distribution achieved and modified by means of the deflection tape has a positive impact on light out-coupling, light extraction angles and directions from the lightguide medium. Typically, the more collimated is light distribution in the lightguide medium, the easier is efficient out-coupling for light incident the out-coupling pattern(s) at predetermined angles due to controlled angular distribution and extraction directivity from a single planar side (e.g. a front side) or both planar sides (front and back sides) of the lightguide medium. Single front side extraction has a positive impact for reducing stray light level and minimizing light loss from the backside, which, in turn, allows for the improved transparency- and contrast ratio, important in a variety of illumination-related implementations, such as window- and signage illumination and display illumination, for example.

The deflection tape can be further applied next to a light incoupling tape or an incoupling element on the planar lightguide surface. By such an arrangement, the incoupled light distribution is harmonized and incoupled light rays are redirected with preferred angular distribution. Typically, incoupled light may have non-uniform internal distribution, manifesting in two separate angular peaks, which can be partially harmonized and collimated at least along vertical axis for an improved second phase function, such as light extraction, polarization, incoupling, beam splitting, and the like. Naturally, the deflection tape possesses a positive impact on a horizontal axis distribution, in order to harmonize internal light distribution and light flux and to remove light streaks from extraction patterns via diffusing or collimating angular distributions of photons.

The terms "optical radiation" and "light" are largely utilized as synonyms unless explicitly stated otherwise and refer to electromagnetic radiation within a certain portion of the electromagnetic spectrum covering ultraviolet (UV) radiation, visible light, and infrared radiation. In some instances, visible light is preferred.

In its broadest sense, the term "lightguide", "waveguide" or "optical waveguide") refers, in the present disclosure, to a device or a structure configured to transmit light thereal-ong (e.g. from a light source to a light extraction surface). The definition involves any type of the lightguide, including, but not limited to a light pipe type component, a lightguide plate, a lightguide panel, and the like.

The expression "a number of" refers herein to any positive integer starting from one (1), e.g. to one, two, or three; whereas the expression "a plurality of" refers herein to any positive integer starting from two (2), e.g. to two, three, or four.

The terms "first" and "second" are not intended to denote any order, quantity, or importance, but rather are used to merely distinguish one element from another.

BRIEF DESCRIPTION OF DRAWINGS

Different embodiments of the present invention will become apparent by consideration of the detailed description and accompanying drawings, wherein:

FIG. 1A is a cross-sectional view of a lightguide with an optical deflection tape 10, according to an embodiment, attached thereto.

FIG. 1B shows a ray distribution model attainable with the deflection tape 10 with a point light source.

FIG. 2 illustrates utilization of the deflection tape 10 on an incoupling element.

FIG. 3 shows various configurations for utilization of the deflection tape 10 on the lightguide (cross-sectional view).

FIGS. 4A and 4B are cross-sectional views of the deflection tape 10, according to the embodiments.

FIG. 5 shows a basic pattern unit for a periodic pattern structure.

FIG. 6 shows an exemplary embodiment for the deflection tape 10.

FIGS. 7A and 7B are graphs illustrative of light distribution of the incoupled light deflected by the tape 10 comprising different pattern designs.

FIG. 8 illustrates the deflection tape 10 comprising two functional zones, according to an embodiment.

FIG. 9 illustrates the deflection tape 10 comprising multiple optically functional zones, according to an embodiment.

FIGS. 10A-10C illustrate incoupling simulations for the lightguide provided with the deflection tape 10 with multiple functional zones attached thereto.

FIG. 11 shows a comparison data between a reference lightguide without the deflection tape 10 and the lightguide comprising the deflection tape 10, according to an embodiment.

FIGS. 12A and 12B illustrate the effects related to illuminance distribution in the lightguide.

FIG. 13 shows a comparison data, in terms of light out-coupling and stray light management functions, for a number of light incoupling solutions.

FIGS. 14A and 14B illustrate utilization of the deflection tape 10 in combination with the incoupling element 100 on the planar lightguide 20.

FIGS. 15A and 15B are comparison graphs illustrative of vertical distribution of incoupled light in a planar lightguide provided with an incoupling element in combination with the deflection tape 10 (FIG. 15A) and the incoupling element without the deflection tape 10 (FIG. 15B).

DESCRIPTION OF EMBODIMENTS

Detailed embodiments of the present invention are disclosed herein with the reference to accompanying drawings. The same reference characters are used throughout the drawings to refer to same members. Following citations are used for the members:

10—an optical deflection tape with a substrate 10A;
11—an optical pattern;
12—optical (pattern) features/cavities with optically multi-functional surfaces 121, 122;
13—contact areas;
In the tape 10:
111—an optically multi-functional layer;
111A, 111B—a patterned substrate layer and an additional substrate layer, accordingly;
112, 113, 114—additional functional layers of the tape 10;
20—an optical waveguide;
20A—a collector medium;
21—an outcoupling pattern;
30—an emitter device (a light source);
31—rays of emitted optical radiation;
32—rays of incoupled and redirected optical radiation;
33—rays of extracted optical radiation;
100—an optical incoupling element with an element substrate 100A.

FIG. 1A is a cross-sectional view of an optical element 20, such as an optical waveguide (a lightguide) structure, with an optical deflection tape 10 (hereafter, the "tape") attached on it's at least one surface. The lightguide is a structure configured to deliver optical radiation (light) emitted by at least one appropriate emitter device 30 towards a particular area that requires illumination. The lightguide is a planar (non-fiber) lightguide with essentially planar surface(s). In a basic lightguide layout (e.g. shown on FIG. 1A) one may distinguish a top surface, a bottom surface and two or more edge surfaces. The top- and bottom surface form horizontal faces of the optical element, whereas the edges extending essentially vertically, with optional inclination at a predetermined angle, between said top- and bottom surfaces along a path that surrounds said optical element when viewed as a two-dimension shape (viz., a perimeter). Longitudinal plane of said planar lightguide lies along its horizontal surface(s).

The lightguide comprises a light-transmitting carrier medium formed from optical polymer or glass. In exemplary embodiments, the lightguide (carrier) medium is polymethyl methacrylate (PMMA). For clarity, reference numeral 20 is used to indicate both the lightguide as an entity and the carrier medium said lightguide is made from.

The tape 10 can be attached on one side- or on both sides (top, bottom) of the planar lightguide. It is reasonable to install the tape 10 on the same side of the lightguide that bears other optical structures, such as a light outcoupling/extracting layer, for example. Especially in window illumination it is beneficial to assemble all optical structures on the window surface facing the interior of a building or a space between the layered windows, due to environment factors.

FIG. 1A shows a lightguide solution having the tape 10 attached on two (planar) surfaces thereof (hereby, top- and bottom surfaces). Additionally or alternatively, the tape 10 can be attached proximate to a light incoupling area/incoupling element and/or on said incoupling element.

Light incoupling element 100 can be mounted onto the lightguide surface to couple light into the lightguide medium. In practice, the incoupling area or the incoupling can be arranged within any site/area of the essentially planar lightguide.

FIG. 2 illustrates various configurations employing utilization of the tape 10 on the incoupling element 100. Said incoupling element 100 has an element substrate 100A mounted on the lightguide medium 20 and having a surface or surfaces onto which the tape 10 is attached to. This surface can be flat or curved. Flat, planar surface of the element 100 may be inclined at a predetermined angle (taper-type incoupling element 100; (iii), FIG. 2). Configurations (i) and (ii), in turn, depict provision of the tape 10 on the incoupling element having the planar surface lying on the same plane/level. Configuration (ii) shows provision of a dual-layer tape, having two tape layers 10, 10A stacked on the top of one another.

Similar dual-layer solution can be conceived for the tape attachable directly on the lightguide (not shown).

Overall, the tape is laid on the lightguide 20 and/or on the element 100 (i.e. positioned against the horizontal surface of said lightguide). With regard to the emitter device(s) 30, the tape 10 is thus positioned such, as to capture light arriving from a direction essentially parallel to a longitudinal plane of the planar lightguide.

It is preferred that the tape 10 has uniform exterior surfaces (the surface facing the lightguide and the surface opposite thereto), i.e. without any surface relief patterns or related structures formed thereon. Still preferably, these surfaces are configured entirely flat and planar.

In view of the utilized technology, implementation of the tape 10 comprising relief patterns (open cavity patterns) is not excluded.

In terms of size-related parameters (length, width, height/thickness), the tape 10 can be configured as required for achieving optimal performance efficiency. Attaching the tape onto the lightguide is enabled or facilitated by adhesion, for example.

The tape 10 allows for a major part of light received onto a light distribution part of the lightguide to be captured and collimated for further distribution in/through the lightguide medium. FIG. 1B thus shows a ray (distribution) model attainable with the tape 10, with a point light source 30. Variation in vertical light distribution (z-direction, FIG. 1B) constitutes about (±) 10 degrees.

The tape 10 and the element 100 can be utilized with any lightguide having essentially planar surface(s), independent on its thickness.

FIG. 3 shows, at (i)-(iv), various layouts for the optical deflection tape 10 on the lightguide 20. Layout (i) is essentially the same as the one shown on FIG. 1A. Layouts (ii) and (iii) show provision of the tape 10 on a planar lightguide medium with a conventional single-sided light out-coupling pattern 21 (ii) and with a conventional dual-sided light out-coupling pattern 21 (iii). Layout (iv) shows provision of the tape 10 on a planar lightguide medium having a single-sided- or a dual-sided light out-coupling patterns 21 configured with embedded cavity optics (while a single-sided configuration is not particularly shown, it can be easily conceived based on FIG. 3, iv).

Light 31 emitted from the emitter device(s) 30 is received into the lightguide and its direction is adjusted by the tape 10. The optical deflection tape is configured to control distribution of light propagating through the lightguide and to mediate light propagation (rays 32) through the lightguide medium towards the out-coupling area(s) 21. Extracted/out-coupled light is indicated by reference numeral 33. An optical out-coupling pattern can be integrated into the lightguide medium by replication, for example, or provided in the form of a coating or a tape applied on the surface of the lightguide.

FIGS. 4A and 4B show the optical deflection tape 10, according to some embodiments. The optical deflection tape 10 comprises a substrate 10A and at least one pattern 11 formed with a number of pattern features 12 embedded in the substrate. Arrangement of pattern features 12 in the substrate material is preferably periodic; however, provision of the pattern 11 as a non-periodic structure is not excluded. The features 12 are configured as optically functional cavities (viz. internal, embedded or integrated cavity optics). The latter are further referred to as "cavities" or "cavity profiles". The substrate material 10A with the embedded pattern 11/embedded cavities 12 forms an optically functional layer 111.

The internal cavities 12 are filled with a material having a refractive index different from the refractive index of the material of the substrate surrounding the cavity.

In some configurations, the cavities 12 are filled with a low refractive index material. Additionally or alternatively, the cavities may be provided with a low refractive index coating. In some configurations, the cavities 12 are filled with air to establish an embedded air-cavity optics solution. Overall, the filling material for said cavities can be established with any one of: a gaseous medium, including air or other gas, fluid, liquid, gel, and solid.

The optically functional layer 111 with embedded pattern 11 is formed from the (sub)layers 111A, 111B. A first substrate layer 111A comprises an essentially flat, planar surface with at least one cavity pattern formed therein (hereafter, a patterned layer). The patterned layer 111A may be provided as a flat, planar layer of substrate material having uniform thickness, in which at least one cavity pattern has been formed. To establish internal cavities and to form an embedded optical pattern, the first substrate layer with a patterned surface is brought against an entirely flat, planar surface of a second substrate component 111B such, that at least one embedded cavity pattern 11 with embedded cavities 12 alternating with flat junction areas 13 is formed at an interface between the patterned substrate surface of the first layer 111A and the entirely flat, planar surface of the second substrate layer 111B.

In practice, the layer 111A is provided as an essentially flat, planar substrate layer with a pattern or patterns comprise(s) cavities (hereafter, a patterned layer). To establish internal cavities and to form an embedded optical pattern, an additional substrate layer 111B, preferably provided as an entirely flat, planar layer, is arranged against the (patterned) layer 111A such, that the internal (viz. embedded or integrated) feature pattern 11 is established at an interface between the patterned layer 111A and the planar layer 111B. The boundary between the substrate layers 111A, 111B is not indicated to emphasize an essentially "one-piece" nature of the optically functional layer 111 with the embedded pattern 11.

In some configurations, the second substrate layer 111B is provided as an entirely flat, planar layer of substrate material having uniform thickness.

The additional substrate layer 111B can be provided as an optically transparent layer, a reflector layer, and/or a coloured layer. The layers 111A, 111B can be made of the same material and/or material with essentially same refractive index. Alternatively, these layers can be made from different materials, the difference being established in terms of at least refractive index, transparency, color and associated optical properties (transmittance, reflectivity, etc.). For example, the entire optically function layer 111 (with both layers 111A, 111B) can be made of a substantially optically transparent substrate material, such as transparent polymer or elastomer, UV resin and the like. Alternatively, the layers 111A, 111B can be made of different materials, having different refractive indices, accordingly.

In some preferred configurations, the essentially flat, planar substrate layer 111A, in which the cavities 12 are formed, is made of substantially optically transparent material. The functional layer 111B is, in turn, configured as a contact layer, to establish a contact surface with topmost structures, such as layers 112 or 114. The layer 111B may thus be configured as an adhesive layer or a dry (solid) layer.

Areas of substrate material alternating with the cavities 12 form contact areas or contact points between the sublayers 111A, 111B, as well as between the optically functional layer 111 and the additional layers 112, 113, 114 (described further below). In certain conditions, the areas 13 form so called light passages, through which light is transmitted between the layers (111, 112, 113 and 114). Light passages are formed when the substrate material 10A is an essentially light-transmitting carrier medium. The pattern 11 thus comprises a number of embedded cavities having contact points/light passages 13 in between.

In some embodiments, the tape 10 is formed with an optically functional layer 111 alone. Such tape consists of the layer 111 having the pattern(s) 11/(air)-cavity profiles 12 totally embedded inside the substrate material (with no prominent pattern features established on external surfaces).

The functional layer 111 and the tape 10 can be implemented with a number of embedded patterns arranged in stacked configuration. Configuration includes joining two or more patterned layers (111A), optionally, optically functional layers (111), together to form a multilayer solution in a single tape. In some configurations, the patterned layers 111A may optionally alternate with the flat substrate layers 111B. Additionally or alternatively, two or more tapes 10 (10-1, 10-2) can be applied on the top of each other to form a multilayer tape configuration (in a manner similar to configuration (ii), FIG. 2).

In some instances, the tape 10 may be formed with a stack comprising two or more patterned layers (referenced as 111A) positioned on the top of each other. Flat, planar interface between the layers may thus be established by virtue of said patterned layers 111A alone (requires that the layer has a pattern established in one of its surfaces, the other surface remaining entirely flat). The topmost patterned layer may thus be provided with the entirely flat substrate 111B to complete the multilayer structure and to enable full encapsulation of the pattern(s).

The stack may thus be implemented with any one of: the patterned layer(s) (111A) optionally alternating with entirely flat substrate layers (111B); the optically functional layers (111); and the tapes 10. The patterns located at different levels in the stack may be configured to perform same of different optical function related to incoupling- and adjusting direction of light received thereto, wherein said optical function is selected from a group consisting of: an incoupling function, a reflection function, a redirecting function, a deflection function, an absorption function, a transmittal function, a collimation function, a refraction function, a diffraction function, a diffusion function, a polarization function, and any combination thereof.

Manufacturing of the functional layer 111 is implemented by joining, preferably by lamination, two or more layers together, whereupon the entirely flat, planar layer 111B is placed against the patterned layer 111A. In some instances, two or more patterned layers can be laminated on top of each other to form a stack. In a basic layout, the open cavities formed in the flat, planar patterned layer become embedded at an entirely flat, planar interface formed between the layers. Flat contact areas 13 are formed during lamination. An important benefit of the tape 10 is a possibility of utilizing a roll-to-roll production method in imprinting the pattern features and laminating all layers together such, that all functional layers are present in one product.

In basic configurations, the tape consists of at least one functional layer 111 formed with embedded cavity optics. To facilitate attachment, the tape further comprises at least one adhesive layer (see e.g. 112) on one- or both sides of said functional layer or a stack of functional layers.

The tape 10 may further comprise a number of additional functional layers, arranged at one or both sides of the optically functional layer 111 (or a stack of optically functional layers), such as a base layer designated on FIGS. 4A, 4B as 112 and a topmost layer designated as 113. These layers render the tape with a number of additional functions.

By way of example, the base layer 112 may be configured as an adhesive layer to enable attachment, by adhesion, to the underlying lightguide medium. The adhesive layer 112 may be provided as an optically clear adhesive (OCA) or a liquid optically clear adhesive (LOCA). The adhesive layer may be provided on any surface of the tape or on both surfaces (top, bottom) of said tape. The tape 10 can thus be configured as a double-side adhesive tape for attaching different elements at either side of the tape.

The topmost/external layer 113 is a functional outer layer, which may be configured as any one of: an optically transparent layer, a non-transparent layer, a reflector layer, a low refractive index ($R_i$) layer, and the like. Alternatively, the topmost layer 113 can be configured as an adhesive layer, similar to that of the base layer 112.

In some configurations, the light deflection tape comprises an additional functional layer (112, 113, 114) configured as a wavelength conversion layer for partial or full conversion of monochromatic light, such as blue (LED) light, for example. The wavelength conversion layer can be arranged on a top- and/or bottom surfaces of the lightguide. In the latter event, the wavelength conversion layer can be arranged together with the adhesive layer and to form an optical connection with the lightguide. The layer with this additional conversion function can be utilized at the edge of the lightguide or on the planar area (light distribution area of said lightguide). Alternatively or additionally, the wavelength conversion layer can be utilized with the incoupling element 100.

In a low $R_i$ configuration, the layer 113 is composed of a so-called low refractive index material that has the refractive index within a range of 1.10-1.41. The refractive index of said low $R_i$ layer is typically below 1.5; preferably, below 1.4. In such an event, the topmost layer 113 is rendered with an optical filter functionality, defined as a capability of changing the spectral intensity distribution or the state of polarization of electromagnetic radiation incident thereupon. The filter may be involved in performing a variety of optical functions, such as transmission, reflection, absorption, refraction, interference, diffraction, scattering and polarization.

FIG. 4B shows the tape 10 further provided with a functional middle layer, which may be configured, for example, as an optically transparent layer or a low $R_i$ layer, as described above.

Configurations shown on FIGS. 4A, 4B are exemplary, therefore, any one of the layers 112, 113, 114 with described functionality can be arranged at any one or both sides of the optically functional layer 111.

By way of example, any one of the additional layers (e.g. 112, 113, 114) can be configured as a black layer to absorb a portion of light passed through the light passages 13 forming the contact points at an interface between the layers. The tape with a black layer may be provided on a backside of the optical element for example. In another exemplary configuration, the additional layer(s) can be optically transparent layer for transmission of light through the contact points 13 at the interface between the layers (111, 112, 113, 114). As discussed above, the contact points (light passages) are formed by the substrate areas 13. In similar manner, any of the additional layers can be configured as a reflector layer, wherein the material of said layer may be adopted for specular reflection, Lambertian reflection or provided as any other reflective non-transparent material. One special solution includes utilization of a low refractive index ($R_i$) layer on the backside of the optically functional layer 111, to make the contact points 13 causing the total internal reflection for the light incident thereon. Indicated solution typically enhances light intensity distribution/light harmonizing efficiency by about 6%-20% depending on the fill factor of said interconnection points (areas 13) and their shape. Described configurations should be adjusted on case-by-case basis, taking into account position of the tape on the lightguide medium.

A primary optical function(s) of the tape 10 is adjusting direction of optical radiation (light) emitted from the source 30 and incident on the pattern(s). The tape is configured to adjust/modify direction of light received thereto such, that light incident on the pattern (or patterns) 11 is deflected to acquire a propagation path through a lightguide medium 20 via a series of total internal reflections. The pattern(s) 11 are therefore designed such that by virtue of said pattern(s), the tape is configured to mediate light propagation through the lightguide medium optionally towards the out-coupling area(s) 21 and to control distribution of light propagating through the lightguide 20.

Light 31 received at the pattern is deflected at the interface between each cavity 12 and the material of the substrate 10A surrounding the cavity. The pattern 11 and the features (cavities) thereof thus perform an optical function or a group of functions related to adjusting a direction of light received thereto. Deflected light 32 acquires a propagation path through the lightguide medium, whereupon an angle of incidence at the interface between each cavity and the material of the substrate surrounding the cavity is/are larger than or equal to a critical angle of total internal reflection.

The pattern 11 is rendered optically functional by providing each individual cavity or a group of cavities in the pattern with a number of parameters, including, but not limited to: dimensions (size), shape, cross-sectional profile, orientation and position in the pattern, fill factor and periodicity.

Each individual cavity in the pattern thus constitutes a profile having a number of optically functional surfaces. By way of example, optically functional surfaces 121, 122 (hereafter, a first optically functional surface and a second optically functional surface, accordingly) are schematically shown on FIGS. 3A, 3B. Each of said surfaces is established at the boundary interface between the cavity 12 and the surrounding substrate medium. One of the mentioned surfaces (hereby, the surface 121) may be provided as an essentially horizontal surface lying essentially in parallel with a longitudinal axis/plane of the lightguide and having light source(s) emitting light along essentially the same axis/plane, whereas the other one (hereby, the surface 122) may be provided as an inclined surface or a vertical surface, relative to the first surface. In fact, all surfaces in the cavity may be rendered optically functional.

The optically functional surface or surfaces is/are thus established by any surface or surfaces formed at the interface between each cavity and the material of the substrate surrounding the cavity.

In some configurations, each said optically functional surface or surfaces in each individual cavity in the pattern is/are established with any one of: a low refractive index reflector, a polarizer, a diffuser, an absorber, or any combination thereof. Thus, any one of the optically functional surfaces, e.g. 121, 122, can be provided with an appropriated coating, such as a low $R_i$ coating.

By way of example, a basic pattern unit for the periodic pattern structure is shown on FIG. 5 (box A). Image B shows is a cross-sectional view of a light deflecting planar surface having a predetermined angle (alpha, a), defined as an angle required for transmission(s) or redirection(s) of light in the lightguide medium. Two images pictured at C are a front view (left) and a top view (right) of the basic pattern unit, according to the box A.

By virtue of the light deflecting cavity pattern or patterns, the tape 10 can be configured to pre-collimate incident light along at least on one axis, such as a vertical axis or a horizontal axis, and to control internal light distribution in order to support the final performance of the lightguide, such as illumination by light extraction, light signal propagation, etc.

As mentioned above, one of the major functions of the optical deflection tape 10 is deflection- and (re)direction of light incident on the pattern at an angle of incidence larger than or equal to a critical angle of total internal reflection. An optical function performed by the tape is applied to light incident on the pattern (incident at the interface between the cavities and the surrounding medium). The incident light is deflected from the original propagation path by a certain angle by means of (air)-cavity optics embedded inside of the tape.

In addition to regulating distribution of said TIR-mediated light propagation through the lightguide medium, the tape is configured to perform a number of additional optical functions, wherein a particular function or a combination of functions is determined by a number of factors, including cavity- and surrounding material related parameters, such as configurations of cavity profile(s) in the pattern and selection of materials (e.g. substrate material forming the optically functional layer 111, material of the additional layers 112, 113, 114, cavity filling material).

In the tape 10, the at least one pattern is configured to perform an optical function related to adjusting a direction of light received thereto, wherein said optical function includes, but is not limited to: a reflection function, an absorption function, a transmittal function, a collimation function, a refraction function, a diffraction function, a polarization function, and any combination thereof.

The cavities in the patterns perform the optical function or functions individually or collectively. Thus, the pattern may be configured such that all cavities in the pattern perform the same function (collective performance). In such an event, the pattern may comprise same (identical) cavities. Alternatively, each individual cavity 12 in the same pattern can be designed to establish an at least one optical function related to adjusting the direction of light received thereto. This is performed by adjusting (at design and manufacturing stage) cavity-related parameters, such as dimensions, shape, cross-sectional profile, orientation, position, periodicity, fill factor etc., as described above. The tape 10 can comprise a number of patterns, with each pattern comprising features/cavities differing from the features/cavities of any other pattern(s) in the tape by at least one parameter.

A fill factor (FF) defined by a percent (%) ratio of the optical features 12 per a unit area is one of the key parameters in designing optical solutions. Fill factor defines a relative portion of the features 12 in the reference area (e.g. a pattern or any other reference area).

In the tape, that pattern or patterns are configured variable by a number of cavity-related parameters, wherein the number of cavity-related parameters comprises an individual parameter or any combination of parameters selected from the group consisting of: dimensions, shape, cross-sectional profile, orientation, position and periodicity.

Achieving the optical function is assisted by provision of the light passage areas 13 between the cavities 12 (FIGS. 3A, 3B). Configuration of said light passages largely depends on configuration of the cavities and on the arrangement of said cavities in the pattern, however, e.g. light transmission property can be controlled and optimized by choice of substrate material.

Light with the optical deflection function applied thereto (i.e. light rays whose direction is adjusted via interaction with the cavity pattern), also referred to as deflected light (32, FIG. 3) acquires a propagation path through a lightguide medium 20 via a series of total internal reflections.

The pattern(s) 11 in the tape can be further adjusted such that light is incident on said pattern(s) at an angle of incidence at the interface between each cavity in the pattern and the material of the substrate surrounding the cavity is/are larger than or equal to a critical angle of total internal reflection. By such an arrangement, direction of light received at the tape 10 and at the pattern(s) 11 is modified at the interface between each cavity in the pattern and the material of the substrate surrounding the cavity to acquire the propagation path through the lightguide medium, whereupon an angle of incidence at an interface between the lightguide medium and an ambient, and, optionally, an angle of incidence at the interface between each cavity and the material of the substrate surrounding the cavity is/are larger than or equal to a critical angle of total internal reflection.

By optical deflection tape 10, direction of light is adjusted such that light arrives on a plane of the boundary (interface) between the lightguide medium and the ambient and, optionally, between each cavity and the substrate medium surrounding said cavity, at the angle of incidence greater than or equal to the critical angle of total internal reflection.

For clarity, the term "deflection" is used hereby primarily with regard to incoupled light rays whose direction is adjusted/modified at the tape 50 (i.e. modified to deviate from its original path, as emitted by the emitter), whereas the term "(re)directing" is applied both to light rays deflected (re-directed) at the tape and light rays that have acquired a propagation path through the lightguide via a series of TIRs after they have been deflected at the tape. Both deflection- and (re)direction functions aim at adjusting direction of optical radiation rays as a result of light interaction with interface/boundary materials (e.g. air-plastic). Interaction occurs, in turn, through a number of optical functionalities, such as reflection, refraction, etc.

Light is total internally reflected at the cavities 12 upon arriving on the pattern at a range of angles of incidence. The cavities 12 can thus be configured, in terms of the functional surfaces 121, 122, to receive and to further distribute light arriving at the pattern (at an angle of incidence equal to or greater than the critical angle relative to an interface created by any one of said optically functional surfaces).

When a ray of light moves through an optically transparent substrate 10A and strikes one of the internal cavity surfaces (121, 122) at a certain angle, the ray of light is either reflected from the surface back to the substrate or refracted into the cavity at the cavity-substrate interface. The condition according to which the light is reflected or refracted is determined by Snell's law, which gives the relationship between angles of incidence and refraction for a light ray incident on an interface between two media with different indices of refraction. Depending on the wavelength of light, for a sufficiently large incident angle (above the "critical angle") no refraction occurs, and the energy of light is trapped within the substrate.

Critical angle is an incident angle of light relative to the surface normal, at which a phenomenon of the total internal reflection occurs. The angle of incidence becomes a critical angle (i.e. equal to the critical angle), when the angle of refraction constitutes 90 degrees relative to the surface normal. Typically, TIR occurs, when light passes from a medium with high(er) refractive index ($R_i$) to a medium with low(er) $R_i$, for example, from plastic ($R_i$ 1.4-1.6) or glass ($R_i$ 1.5) to the air ($R_i$ 1) or to any other media with essentially low refractive indices. For a light ray travelling from the high $R_i$ medium to the low $R_i$ medium, if the angle of incidence (at a glass-air interface, for example) is greater than the critical angle, then the medium boundary acts as a very good mirror and light will be reflected (back to the high $R_i$ medium, such as glass). When TIR occurs, there is no transmission of energy through the boundary. From the other hand, light incident at angle(s) less than the critical angle, will be partly refracted out of the high $R_i$ medium and partly reflected. The reflected vs refracted light ratio largely depends on the angles of incidence and the refraction indices of the media.

Critical angle varies with a substrate-air interface (e.g. plastic-air, glass-air, etc.). For example, for most plastics and glass critical angle constitutes about 42 degree. Thus, in an exemplary waveguide, light incident at a boundary between a light-transmitting medium, such as a PMMA sheet, and air at an angle of 45 degree (relative to the surface normal), will be probably reflected back to the lightguide medium, thereby, no light out-coupling will occur.

The same principle applies to light travelling, via a series of TIR, through the lightguide medium. We note, that TIR-mediated light propagation through the lightguide, may occur also outside the boundaries defined by the deflection tape or tapes. TIR phenomenon is established by a lightguide design and/or choice of lightguide media.

The optical deflection tape 10 can be further referred to as an optical harmonizer tape.

Three-dimensional pattern is established, typically with constant periodic pattern features or variable periodic pattern features. Periodicity is a necessary feature to control and deflect a plane wave in the lightguide medium and to redirect the incident light (i.e. light incident on the pattern) for preferred distribution. In additional case, aperiodic pattern features might be utilized for harmonizing non-uniform light flux and/or light distribution.

In each individual pattern, the cavities 12 can be established with discrete- or with at least partly continuous pattern features. Examples of discrete patterns include a dot, a pixel, and the like.

FIGS. 7A and 7B are graphs illustrative of light distribution (in YZ-plane) of the incoupled light deflected by different patterns A and B, wherein configuration B has overlapping pattern structures (40%) with flat parts. Configuration A has interlocked pattern structures without overlapping with flat parts. Sum of points is 100% for curve 2.

On FIG. 7A the curves are designated as follows: Curve 1 ("output light") is indicative of incoupled LED light distribution in the lightguide, wherein direction of incoupled light is adjusted by the tape 10 in configuration A. Curve 1 shows significantly more collimated light compared to curves 2 or 3. Coupling efficiency is 83%.

Curve 2 ("input light") is indicative of the incoupled LED light distribution in the lightguide (without the tape 10).

Curve 3 ("flat $R_i$=1.41 cladding and a black tape") is indicative of the incoupled light distribution in the lightguide, wherein the incoupled LED light is filtered with a low $R_i$ coating ($R_i$=1.41) having a black tape on top, which absorbs light incident at angles larger than or equal to a critical angle of total internal reflection. With such an arrangement, about 36% of the light intensity is lost. Coupling efficiency is 64%.

On FIG. 7B the curves are designated as follows: Curve 1 ("output light") is indicative of incoupled LED light distribution in the lightguide, wherein direction of incoupled light is adjusted by the tape 10 in configuration B. Curve 1 shows significantly more collimated light intensity compared to curves 2 or 3. Coupling efficiency is 89%. Curve 2 and curve 3 designations and legend for FIG. 7B are the same as for FIG. 7A.

In the tape 10, the cavities can be configured and arranged in the pattern such as to form a substantially constant periodic pattern, wherein the optical pattern solution is based on similar and continuously repeating features in the pattern.

In the pattern, the cavities can be configured and arranged such, as to form a substantially variable (or segmental) periodic pattern, wherein each local pattern design has features substantially variable from the other local designs within said pattern. Thus, in some configurations, the tape 10 comprises a number of patterns arranged in periodic segments, wherein each segment has a predefined area and a length of a period. These local patterns can be rendered variable in terms of modifying pattern- and/or cavity-related parameters, to manage light incident thereto at a predetermined angle or a range of angles. The cavity profiles can be configured variable in terms of a number of parameters selected from any one of: dimensions, shape, cross-sectional profile, orientation and position in the pattern.

In the tape, the cavities are thus established with three-dimensional pattern features having cross-sectional profiles selected from the group consisting of: linear, rectangular, triangular, blazed, slanted, trapezoid, curved, wave-shaped and sinusoidal profiles.

Furthermore, in terms of pattern(s) configuration and arrangement, the tape 10 is designed and optimized for a certain lightguide thickness and other lightguide-specific parameters.

An example of the optical deflection tape with a periodic pattern is shown on FIG. 6.

A number of periodic features 12 are highlighted. The pattern 11 shown on FIG. 6 is based on a 3D optical pattern design with air-cavity profiles.

In, the tape 10, a number of patterns, optionally arranged in segments, can be arranged to form a single functional zone. In another configuration, a number of patterns, optionally arranged in segments, can be arranged such, as to form at least two adjacent functional zones. Formation of multiple functional zones is illustrated by FIG. 9.

In the tape 10 comprising multiple functional zone (wherein the number of zones exceeds two), each zone or a group of adjacent or non-adjacent zones can have a characteristic cavity profile to efficiently manage light incident at a certain angle.

FIG. 8 illustrates a tape 10 comprising two functional zones ($1^{st}$ and $2^{nd}$ zones, accordingly) formed with different patterns 11. Difference between the patterns can be clearly observed from the figure. In the arrangement of FIG. 8, the pattern forming the first functional zone and the pattern forming the second functional zone are each independently configured to perform the optical function related to controlling the distribution of light propagating through the lightguide (deflected light is indicated by the reference numeral 32). Additionally, the pattern forming the first functional zone is configured to transmit at least a portion of light 31 incident at said pattern to an optical collector medium 20A. The pattern forming the first zone can be configured to transmit the incident light into the collector 20A. In such an event, the optical deflection function (32) is performed by the pattern forming the second zone (not shown).

The configuration of FIG. 8 describes the tape enabling at least two-phase optical function, wherein the tape comprises a number of functional zones configured to perform a variety of optical functions. Thus, at the first functional zone a portion of incident light is deflected back to lightguide medium and another portion is transmitted through said first functional zone to a subsequent functional zone. Light incoupled at different angles can thus be distributed through the lightguide with enhanced efficiency.

In some configurations, the tape 10 comprises patterns forming the first- and the second functional zones alternating n times along the surface of the lightguide 20 and the entire surface of the optical collector medium 20A.

FIG. 9 illustrates an exemplary embodiment of the tape 10 comprising multiple optically functional zones (hereby, 14 zones), said zones formed with different pattern features. In the present example, the zones are arranged into five (5) groups, wherein each zone in the group (1-5) is formed with a pattern having a predetermined angle alpha (as described with regard to FIG. 5).

FIGS. 10A-10C illustrate incoupling simulations for the lightguide provided with the optical deflection tape 10 with multiple functional zones attached thereto. FIG. 10A is a simulation for a 3 mm thick lightguide (functional zones 1-14 functional zones; the same arrangement as on FIG. 9). FIG. 10B is a simulation for a 2 mm thick lightguide (functional zones 3-12). FIG. 10C is s simulation for a 1 mm thick lightguide (functional zones 4-13) Numbering pertains to that shown on FIG. 9. Curves 1 and 2 refer to output light and input light, in the same manner as described for FIGS. 7A, 7B.

Each such functional zone can be marked with a characteristic sign or signal in order to distinguish between the zones. The tape 10 may be then cut according to these markings, and the cut modules can be independently applied onto different parts of the lightguide. Such an arrangement facilitates construction of layered solutions (having two or more layers of the tape provided in stacked configuration, see FIG. 2 (ii)), and it is beneficial for applying the (same) deflection tape on different portions of the lightguide having different thickness. An exemplary solution includes utilizing e.g. colour codes on a top liner, such as a protective liner (not shown). A code legend can be provided in an instruction booklet placed in the tape package, for example.

A multi-phase design facilitates manufacturing, since provision of complex optical designs can be avoided. Additionally, manufacturing of said complex designs at reasonable cost is often impossible. The multi-phase solution suggested hereby solves the problem of increasing optical performance of the lightguide at reasonable costs. This is attained by grouping together optical patterns with relatively simple design.

Modular tape concept provides for cost-effective manufacturing and flexibility for utilization. For different purposes, modularity level of the tape can be optimized on a case-by-case basis, wherein optimization of the optical patterns can be implemented on deterministic or non-deterministic and/or periodic or aperiodic design features to realize performance of a single optical function of multiple optical functions.

FIG. 11 shows a comparison data between a reference lightguide without the optical deflection tape 10 (image A) and the lightguide comprising a 10 mm long deflection tape 10 (image B) attached at both (top and bottom) surfaces of the lightguide within an incoupling area. One may observe that by utilizing the tape 10, the optical efficiency of the lightguide is about 85%.

FIGS. 12A and 12B illustrate the effects related to illuminance (internal intensity) distribution and attainable by optimizing of the tape 10. FIG. 12A is graph illustrative of illuminance distribution attainable by using the deflection tape 10 in a manner described for FIG. 11. The graph of FIG. 12A is an enlarged image of the illuminance distribution graph shown on FIG. 11 (image B). Unwanted light emissions are emphasized by arrows.

FIG. 12B is graph illustrative of illuminance distribution attainable by using the deflection tape 10 additionally comprising a black layer (e.g. the layer 113 or 114). Black layer on the top of the tape absorbs light incident (on the tape) at all unwanted angles. But the main intensity peak remains the same.

FIG. 13 shows a comparison data, in terms of light out-coupling and stray light management functions, for a number of light incoupling solutions. Image A shows a reference lightguide without the optical deflection tape 10, whereas image B shows the lightguide comprising a 10 mm long deflection tape 10 attached at top- and bottom sides of the lightguide within an incoupling area. Image C shows incoupling with a parabolic concentrator device. An image on the right shows stray light ratios for the solutions according to images A, B and C. Y-axis defines stray light ratio/:1; whereas the x-axis defines an angular cone around normal axis/degrees)(°. Stray light ratio is defined as an amount of out-coupled light/stray light. Numerically the best stray light ratio has been attained with the lightguide having the deflection tape 10 attached thereto (solution B).

The tape 10 can be provided in the form of a roll, as being produced by roll-to-roll lamination processes.

In an aspect, the optical incoupling element 100 is provided, said element comprises the element substrate 100A and optionally the optical deflection tape 10 according to the described embodiments. The tape 10 can be attachable onto at least one surface of the element substrate.

FIGS. 14A and 14B are illustrative of utilization of the optical deflection tape 10 in combination with the incoupling element 100 on the planar lightguide 20. The tape 10 is arranged subsequent to the incoupling element 100. FIG. 2 illustrates the solution, where the tape 10 is attached on the top surface of the incoupling element 100.

FIGS. 14A, 14B show the element 100 having a curved top surface. Provision of the element with a planar top surface (provided on same plane/level and inclined) is illustrated by FIG. 2.

FIG. 14A is a ray tracing model for the lightguide provided with the incoupling element 100 and the deflection tape 10. FIG. 14B is illustrative of exemplary dimensions of the lightguide having the incoupling element 100 and the tape 10 comprising the optically functional zones A, B and C. Dimensions are given in millimetres (mm).

FIGS. 15A and 15B are comparison graphs illustrative of vertical light distribution (YZ-plane) for a planar lightguide comprising the incoupling element 100 with the tape 10 and without said tape, accordingly. For solution of FIG. 15A that utilizes that tape 10, provision of the tape 10 is subsequent to the incoupling element 100, as shown on FIGS. 14A, 14B. Sum of points for curve 2 is 100%. From FIG. 15A one may observe that light distribution in the lightguide medium is harmonized by tape 10. More narrow distribution of light incident inside the lightguide improves contrast ratio of the lightguide upon light out-coupling. Transparency on the non-illuminated side of the lightguide is improved, accordingly.

In another aspect, a method for manufacturing the optical deflection tape 10 is provided, said method comprises: manufacturing a patterned master tool for said at least one pattern by a suitable fabrication method; transferring the pattern onto the substrate to generate a patterned substrate; and generating an embedded cavity pattern or patterns by applying, onto said patterned substrate, an additional flat, planar substrate layer, such that internal cavities are formed at a fully flat, planar interface between the substrate layers.

The pattern can be fabricated by any suitable method, including, but not limited to: lithographic, three-dimensional printing, micro machining, laser engraving, or any combination thereof. Other appropriate methods may be utilized.

It is preferred that the embedded cavity pattern or patterns is implemented by a roll-to-roll lamination methods, wherein sublayers 111A, 111B are laminated against one another to form the optically functional layer 111.

The additional substrate layer (111B) can be applied onto the patterned substrate layer (111A) by a lamination method selection from any one of: a roll-to-roll lamination, a roll-to-sheet lamination or a sheet-to-sheet lamination.

Once fabricated pattern is advantageously further replicated by any suitable method, such imprinting, extrusion replication or three-dimensional printing. Any other appropriate method may be utilized.

Typical production line is adopted to perform the following processes: a) pattern fabrication and replication; b) cavity lamination; c) preparation of other/additional layer(s) and lamination thereof; and d) final film cutting. The production line can be further adopted for manufacturing narrow- or wide tape products.

A sheet or a roll of the optical deflection tape produced during steps a-c can be transferred for cutting elsewhere.

The invention further pertains to provision of a lightguide 20 comprising an optically transparent medium configured to establish a path for light propagation through the lightguide, and the optical deflection tape 10, implemented according to the embodiments described hereinabove, wherein the optical deflection tape is attached onto at least one planar surface of said lightguide. In some configurations, the optical deflection tape is attached to the lightguide by adhesion.

The lightguide can further comprise at least one light source, provided as any one of: a Light Emitting Diode (LED), an Organic Light Emitting Diode (OLED), a laser diode, a LED bar, an OLED strip, a microchip LED strip, and a cold cathode tube.

In some configurations, the lightguide can comprise at least one light emitter device configured for emitting monochromic light, such as a monochromic LED device, and the optical deflection tape that comprises a wavelength conversion layer or layers.

A use of said lightguide in illumination and/or indication is further provided. The lightguide can be used for the illumination and indication related purposes including, but not limited to: of decorative illumination, light shields and masks, public and general illumination, including window, facade and roof illumination, signage, signboard, poster and/or an advertisement board illumination and indication, and in solar applications.

It is clear to a person skilled in the art that with the advancement of technology the basic ideas of the present invention are intended to cover various modifications thereof. The invention and its embodiments are thus not limited to the examples described above; instead they may generally vary within the scope of the appended claims.

REFERENCES

1. Carlos Angulo Barrios and Victor Canalejas-Tejero, "Light coupling in a Scotch tape waveguide via an integrated metal diffraction grating," Opt. Lett. 41, 301-304 (2016).
2. Bernard C. Kress, "Optical waveguide combiners for AR headsets: features and limitations", Proc. SPIE 11062, Digital Optical Technologies 2019, 110620) (16 Jul. 2019).
3. Moon et al, "Microstructured void gratings for outcoupling deep-trap guided modes," Opt. Express 26, A450-A461 (2018).

The invention claimed is:

1. An optical deflection tape for a lightguide, comprising: a substrate, and
at least one pattern formed with multiple three-dimensional periodic pattern features embedded in a substrate material of the substrate and configured as optically functional embedded cavities filled with a fill material having a refractive index different from a refractive index of the substrate material surrounding the optically functional embedded cavities,
wherein the at least one pattern is configured to adjust a direction of light received thereto such that light incident at the at least one pattern is deflected by a cooperative optical function, which is provided as a combination of at least two functions selected from a group consisting of a reflection function, a refraction function, a diffraction function, a transmission function and an absorption function, to acquire a propagation path through a lightguide medium via a series of total internal reflections, and wherein by virtue of the at least one pattern, the optical deflection tape is configured to control distribution of light propagating through the lightguide, wherein the optical deflection tape is attached onto at least one planar surface of the lightguide.

2. The optical deflection tape of claim 1, wherein light received at the at least one pattern is deflected at an interface between each of the optically functional embedded cavities and the substrate material surrounding the optically functional embedded cavities to acquire the propagation path through the lightguide medium, whereupon an angle of incidence at an interface between the lightguide medium and an ambient medium is larger than or equal to a critical angle of total internal reflection.

3. The optical deflection tape of claim 2, wherein an angle of incidence at the interface between each of the optically functional embedded cavities and the substrate material surrounding the optically functional embedded cavities is equal to or larger than the critical angle of total internal reflection.

4. The optical deflection tape of claim 1, wherein the at least one pattern is configured to perform an optical function related to adjusting the direction of light received thereto, wherein the optical function is selected from a group consisting of: a deflection function, a re-directing function, a reflection function, an absorption function, a transmittal function, a collimation function, a refraction function, a diffraction function, a diffusion function, a polarization function, and any combination thereof.

5. The optical deflection tape of claim 1, wherein the at least one pattern is rendered optically functional by providing a cavity or a group of cavities, among the optically functional embedded cavities, with any combination of parameters selected from the group consisting of: dimensions, shape, cross-sectional profile, orientation, position, periodicity, and fill factor.

6. The optical deflection tape of claim 1, wherein each individual cavity, among the optically functional embedded cavities, has multiple optically functional surfaces.

7. The optical deflection tape of claim 1, wherein an optically functional surface or surfaces of the optically functional embedded cavities is/are established by any surface or surfaces formed at the interface between each of the optically functional embedded cavities and the substrate material surrounding the optically functional embedded cavities.

8. The optical deflection tape of claim 1, wherein an optically functional surface or surfaces in each of the optically functional embedded cavities is/are established with any one of a low refractive index reflector, a polarizer, a diffuser, an absorber, or any combination thereof.

9. The optical deflection tape of claim 1, wherein the optically functional embedded cavities are configured and arranged in the at least one pattern so as to form a substantially variable periodic pattern.

10. The optical deflection tape of claim 1, wherein the optically functional embedded cavities are configured and arranged in the at least one pattern so as to form a substantially constant periodic pattern.

11. The optical deflection tape of claim 1, wherein in the at least one pattern the optically functional embedded cavities are established with discrete or at least partly continuous pattern features.

12. The optical deflection tape of claim 1, comprising the at least one pattern including multiple patterns arranged in periodic segments, each periodic segment having a predefined area and a length of a period.

13. The optical deflection tape of claim 12, wherein the first and the second functional zones alternate n times along the surface of the lightguide and the entire surface of the optical collector medium.

14. The optical deflection tape of claim 1, comprising the at least one pattern including patterns arranged to form at least two adjacent functional zones, wherein one of the patterns form forming a first functional zone and one of the patterns forming a second functional zone are independently configured to perform the optical function related to controlling the distribution of light propagating through the lightguide, and, wherein the one of the patterns forming the first functional zone is additionally configured to transmit at least a portion of light incident thereat to an optical collector medium.

15. The optical deflection tape of claim 1, wherein the at least one pattern includes patterns that are configured variable by cavity-related parameters that comprises an individual parameter or any combination of parameters selected from the group consisting of: dimensions, shape, cross-sectional profile, orientation, position, periodicity, and fill factor.

16. The optical deflection tape of claim 1, wherein the optically functional embedded cavities are established with three-dimensional pattern features having cross-sectional profiles selected from the group consisting of: linear, rectangular, triangular, blazed, slanted, trapezoid, curved, wave-shaped and sinusoidal profiles.

17. The optical deflection tape of claim 1, wherein the optically functional embedded cavities are filled with a gaseous material.

18. The optical deflection tape of claim 1, configured attachable onto a planar surface or planar surfaces of the lightguide by adhesion.

19. The optical deflection tape of claim 1, wherein the substrate is provided as a flat, planar substrate layer.

20. The optical deflection tape of claim 19, wherein the flat, planar substrate layer is made of substantially optically transparent material.

21. The optical deflection tape of claim 1, wherein the optically functional embedded cavities are formed at an interface with an additional flat, planar substrate layer, provided as an optically transparent layer, a reflector layer, and/or a coloured layer.

22. The optical deflection tape of claim 1, wherein the optically functional embedded cavities are arranged in a stacked configuration.

23. The optical deflection tape of claim 1, further comprising a wavelength conversion layer.

24. The optical incoupling element of claim 23, wherein the surface of the element substrate is planar or curved.

25. An optical incoupling element comprising an element substrate and an optical deflection tape as defined in claim 1, attached onto a surface of the element substrate.

26. An optical unit, comprising at least one optical incoupling element with an adhesion layer for a lightguide attachment and at least one emitter device, wherein the at least one optical incoupling element is configured as defined in claim 25.

27. The optical unit of claim 26, wherein at least one emitter device is at least partly integrated inside the element substrate, or installed adjacent to or on the element substrate.

28. A lightguide, comprising an optically transparent medium configured to establish a path for light propagation through the lightguide, and an optical deflection tape, as defined in claim 1, the optical deflection tape being attached onto at least one planar surface of the lightguide.

29. The lightguide of claim 28, comprising the optical deflection tape being attached thereto by adhesion.

30. The lightguide of claim 28, further comprising at least one light emitter device, selected from a group consisting of: a Light Emitting Diode (LED), an Organic Light Emitting Diode (OLED), a laser diode, a LED bar, an OLED strip, a microchip LED strip, and a cold cathode tube.

31. The lightguide of claim 28, comprising at least one light emitter device configured for emitting monochromic light, and the optical deflection tape that comprises the wavelength conversion layer.

32. Use of a lightguide, as defined in claim 28, in illumination and/or indication.

33. A roll of an optical deflection tape that includes the optical deflection tape according to claim 1.

34. A method for manufacturing an optical deflection tape comprising at least one pattern formed with multiple periodic cavity features fully embedded in a substrate material of a substrate,
the method comprises:
 manufacturing a patterned master tool for the at least one pattern by a fabrication method selected from any one of: lithographic, three-dimensional printing, micro-machining, laser engraving, or any combination thereof;
 transferring the at least one pattern onto the substrate to generate a patterned substrate; and
 generating an embedded cavity pattern or patterns by applying onto the patterned substrate an additional flat, planar substrate layer, such that embedded cavities are formed at a fully flat, planar interface between layers of the substrate, wherein the embedded cavities are configured as optically functional embedded cavities filled with a fill material having a refractive index different from a refractive index of the substrate material surrounding the optically functional embedded cavities, and
 wherein the at least one pattern is configured to adjust a direction of light received thereto such that light incident at the at least one pattern is deflected by a cooperative optical function, which is provided as a combination of at least two functions selected from a group consisting of: a reflection function, a refraction function, a diffraction function, a transmission function and an absorption function, to acquire a propagation path through a lightguide medium via a series of total internal reflections, and wherein by virtue of the at least one pattern, the optical deflection tape is configured to control distribution of light propagating through the lightguide.

35. The method of claim 34, wherein the additional substrate layer is applied onto the patterned substrate layer by a lamination method selection from any one of: a roll-to-roll lamination, a roll-to-sheet lamination or a sheet-to-sheet lamination.

36. The method of claim 34, further comprising replication of a fabricated pattern, wherein pattern replication method is selected from any one of imprinting, extrusion replication or three-dimensional printing.

* * * * *

UNITED STATES PATENT AND TRADEMARK OFFICE
CERTIFICATE OF CORRECTION

PATENT NO. : 12,078,837 B2
APPLICATION NO. : 18/019284
DATED : September 3, 2024
INVENTOR(S) : K. Nakamura et al.

Page 1 of 1

It is certified that error appears in the above-identified patent and that said Letters Patent is hereby corrected as shown below:

In the Claims

Column 23, Line 30 (Claim 14, Line 4), please change "form forming" to -- forming --.

Signed and Sealed this
Fourth Day of February, 2025

Coke Morgan Stewart
*Acting Director of the United States Patent and Trademark Office*